US011758239B2

(12) United States Patent
Kitazato et al.

(10) Patent No.: US 11,758,239 B2
(45) Date of Patent: Sep. 12, 2023

(54) RECEPTION APPARATUS, RECEPTION METHOD, TRANSMISSION APPARATUS, AND TRANSMISSION METHOD

(71) Applicant: Saturn Licensing LLC, New York, NY (US)

(72) Inventors: Naohisa Kitazato, Tokyo (JP); Jun Kitahara, Shizuoka (JP); Yasuaki Yamagishi, Kanagawa (JP); Taketoshi Yamane, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/558,217

(22) PCT Filed: Mar. 22, 2016

(86) PCT No.: PCT/JP2016/001636
§ 371 (c)(1),
(2) Date: Sep. 14, 2017

(87) PCT Pub. No.: WO2016/157824
PCT Pub. Date: Oct. 6, 2016

(65) Prior Publication Data
US 2018/0048941 A1 Feb. 15, 2018

(30) Foreign Application Priority Data
Apr. 3, 2015 (JP) ................. 2015-076733

(51) Int. Cl.
*H04N 21/488* (2011.01)
*H04N 21/45* (2011.01)
(Continued)

(52) U.S. Cl.
CPC ........ *H04N 21/4882* (2013.01); *H04H 20/59* (2013.01); *H04L 12/1895* (2013.01);
(Continued)

(58) Field of Classification Search
CPC .......... H04N 21/4882; H04N 21/2362; H04N 21/4345; H04N 21/4524
(Continued)

(56) References Cited

U.S. PATENT DOCUMENTS 9,467,240 B2 * 10/2016 Kwak .................... H04H 20/59
2003/0224767 A1 * 12/2003 Futamase ............. G10H 1/0025
455/414.1
(Continued)

FOREIGN PATENT DOCUMENTS

CA    2 898 429 A1    8/2014
JP    2000-183769 A    6/2000
(Continued)

OTHER PUBLICATIONS

"ATSC Mobile DTV Standard: A/153 Part 10, Mobile Emergency Alert System (A/153 Part 10:2013)," Advanced Television Systems Committee, XP 055178642, Mar. 11, 2013, (20 pages).
(Continued)

*Primary Examiner* — Joshua D Taylor
(74) *Attorney, Agent, or Firm* — Oblon, McClelland, Maier & Neustadt, L.L.P.

(57) ABSTRACT

There is provided a reception apparatus including circuitry configured to receive region mapping information that includes at least one target region identifier and, for each of the at least one target region identifier, location information associated with the respective target region identifier. The circuitry is further configured to control filtering such that emergency information for a location associated with the reception apparatus is acquired based on the region mapping information.

27 Claims, 18 Drawing Sheets

(51) Int. Cl.

| | |
|---|---|
| *H04N 21/454* | (2011.01) |
| *H04N 21/434* | (2011.01) |
| *H04W 4/021* | (2018.01) |
| *H04H 20/59* | (2008.01) |
| *H04L 12/18* | (2006.01) |
| *H04W 4/90* | (2018.01) |
| *H04N 21/2362* | (2011.01) |
| *H04L 51/222* | (2022.01) |
| *H04L 67/52* | (2022.01) |
| *H04L 67/565* | (2022.01) |
| *H04H 60/51* | (2008.01) |
| *H04N 21/643* | (2011.01) |

(52) U.S. Cl.
CPC ............ *H04L 51/222* (2022.05); *H04L 67/52* (2022.05); *H04L 67/565* (2022.05); *H04N 21/2362* (2013.01); *H04N 21/4345* (2013.01); *H04N 21/454* (2013.01); *H04N 21/4524* (2013.01); *H04W 4/021* (2013.01); *H04W 4/90* (2018.02); *H04H 60/51* (2013.01); *H04N 21/64322* (2013.01)

(58) Field of Classification Search
USPC .......................................................... 725/33
See application file for complete search history.

(56) References Cited

U.S. PATENT DOCUMENTS

| | | | | |
|---|---|---|---|---|
| 2007/0083884 | A1* | 4/2007 | Kim | ..................... H04N 21/426 |
| | | | | 725/33 |
| 2007/0202886 | A1 | 8/2007 | Dhebri et al. | |
| 2008/0059998 | A1* | 3/2008 | McClenny | ............. H04N 7/163 |
| | | | | 725/33 |
| 2010/0151882 | A1* | 6/2010 | Gillies | .................. H04W 4/029 |
| | | | | 455/456.1 |
| 2010/0189028 | A1* | 7/2010 | De Camargo | ......... H04N 7/163 |
| | | | | 370/321 |
| 2013/0023227 | A1* | 1/2013 | Yokoyama | ............... H04W 4/90 |
| | | | | 455/404.1 |
| 2014/0007158 | A1* | 1/2014 | Bhagwat | .............. G08B 27/005 |
| | | | | 725/33 |
| 2014/0050137 | A1* | 2/2014 | Alberth, Jr. | ............. H04W 4/90 |
| | | | | 370/312 |
| 2014/0273911 | A1* | 9/2014 | Dunn | ...................... H04W 4/90 |
| | | | | 455/404.1 |
| 2015/0085735 | A1* | 3/2015 | Shelby | .................... H04L 65/80 |
| | | | | 370/312 |
| 2015/0372775 | A1 | 12/2015 | Kwak et al. | |
| 2016/0219331 | A1* | 7/2016 | Stewart | .................. H04H 20/59 |
| 2018/0097574 | A1* | 4/2018 | Ryu | ..................... H04N 21/814 |

FOREIGN PATENT DOCUMENTS

| | | |
|---|---|---|
| JP | 2006-506849 A | 2/2006 |
| JP | 2007-13889 A | 1/2007 |
| JP | 2015-61195 A | 3/2015 |
| WO | 2007/101167 A1 | 9/2007 |
| WO | WO-2014119961 A1 * | 8/2014 ............ H04H 20/59 |

OTHER PUBLICATIONS

International Search Report dated Jun. 3, 2016 in PCT/JP2016/001636 filed Mar. 22, 2016.

Office Action dated Dec. 11, 2018 in Japanese Patent Application No. 2015-076733.

\* cited by examiner

FIG. 4

| TARGET REGION TAG | REGION CODE (FIPS COUNTY CODE) | GEO-LOCATION INFORMATION (GEO-LOCATION) |
|---|---|---|
| 0x0001 | 18181, 18015, 18157, 18023 | a1x, a1y, b1x, b1y |
| 0x0002 | 18107, 18011, 18133, 18063, 18097, 18119, 18105, 18013, 18081, 18109 | a2x, a2y, b2x, b2y |
| 0x0003 | 18049, 18017, 18103, 18169, 18067, 18053, 18069, 18009, 18035 | a3x, a3y, b3x, b3y |
| 0x0004 | 18159, 18057, 18095, 18065, 18075, 18135, 18177, 18041, 18139, 18059, 18145, 18005, 18031 | a4x, a4y, b4x, b4y |
| 0x0005 | 18109 | a5x, a5y, b5x, b5y |

FIG. 7

| FIELD | |
|---|---|
| CO | Compression or not. Compression type 0:non-compression 1: zip 2:bim 3: reserved |
| Type | Signaling type |
| Type extension | Extension field depending on signaling type |
| Version | Version number for each signaling data with specific type and type extension |

| TYPE | SIGNALING DATA |
|---|---|
| 0x00 | LLS packaged |
| 0x01 | FIT |
| 0x02 | RRT |
| 0x03 | EAT |
| 0x04 | ADT |

FIG. 11

| ELEMENT/ATTRIBUTE | | | | | APPEARANCE FREQUENCY | DEFINITION |
|---|---|---|---|---|---|---|
| adt | | | | | | |
| | area | | | | 1..n | EA TARGET REGION |
| | | @areaTag | | | 1 | TARGET REGION TAG |
| | | codes | | | 0..1 | REGION CODE |
| | | | @type | | 1 | REGION CODE TYPE "fipsc", "fipss", "zip5", "zip9" |
| | | | unit | | 1..n | REGION CODE VALUE |
| | | geo_loc | | | 0..1 | GEO-LOCATION INFORMATION (GRID COORDINATES) |
| | | | @nw_lat | | 1 | LATITUDE OF NORTH WEST END |
| | | | @nw_lon | | 1 | LONGITUDE OF NORTH WEST END |
| | | | @se_lat | | 1 | LATITUDE OF SOUTH EAST END |
| | | | @se_lon | | 1 | LONGITUDE OF SOUTH EAST END |

FIG. 12

| ELEMENT/ATTRIBUTE | | | | APPEARANCE FREQUENCY | DEFINITION |
|---|---|---|---|---|---|
| Eat | | | | 1 | EMERGENCY NOTIFICATION INFORMATION TABLE |
| | AutomaticTuningService | | | 0..1 | AUTOMATIC CHANNEL SELECTION SERVICE AT TIME OF Wake-up |
| | | @broadcastStreamID | | 0..1 | NETWORK IDENTIFIER OF AUTOMATIC CHANNEL SELECTION SERVICE |
| | | @serviceId | | 1 | SERVICE IDENTIFIER OF AUTOMATIC CHANNEL SELECTION SERVICE |
| | EAMessage | | | 0..n | EMERGENCY INFORMATION MESSAGE |
| | | @eaMessageId | | 1 | EMERGENCY INFORMATION IDENTIFIER |
| | | @eaPriority | | 0..1 | PRIORITY LEVEL OF EMERGENCY INFORMATION |
| | | EAGeoloc | | 0..n | TARGET REGION DETAILED DESIGNATION |
| | | | @type | 0..1 | REGION IDENTIFICATION TYPE "adt", "fips5", "zip5", "zip9" |
| | | EAMessageData | | 0..1 | SUBTITLE INFORMATION OF EMERGENCY INFORMATION |
| | | EAApplication | | 0..1 | EMERGENCY INFORMATION APPLICATION |
| | | | @applicationId | 1 | APPLICATION IDENTIFIER |
| | | EAService | | 0..n | EMERGENCY INFORMATION SERVICE |
| | | | @serviceId | 1 | SERVICE IDENTIFIER |
| | | | @serviceType | 1 | SERVICE TYPE "nrt", "tv", "audio" |
| | | EAWww | | 0..n | EMERGENCY INFORMATION SITE |
| | | | @uri | 1 | URL OF EMERGENCY INFORMATION SITE |
| | | EA_phonetic_info | | 0..1 | VOICE READING |
| | | | @format | 1 | "ssml" |
| | | | @url | 0..1 | URL ACQUIRED THROUGH COMMUNICATION |

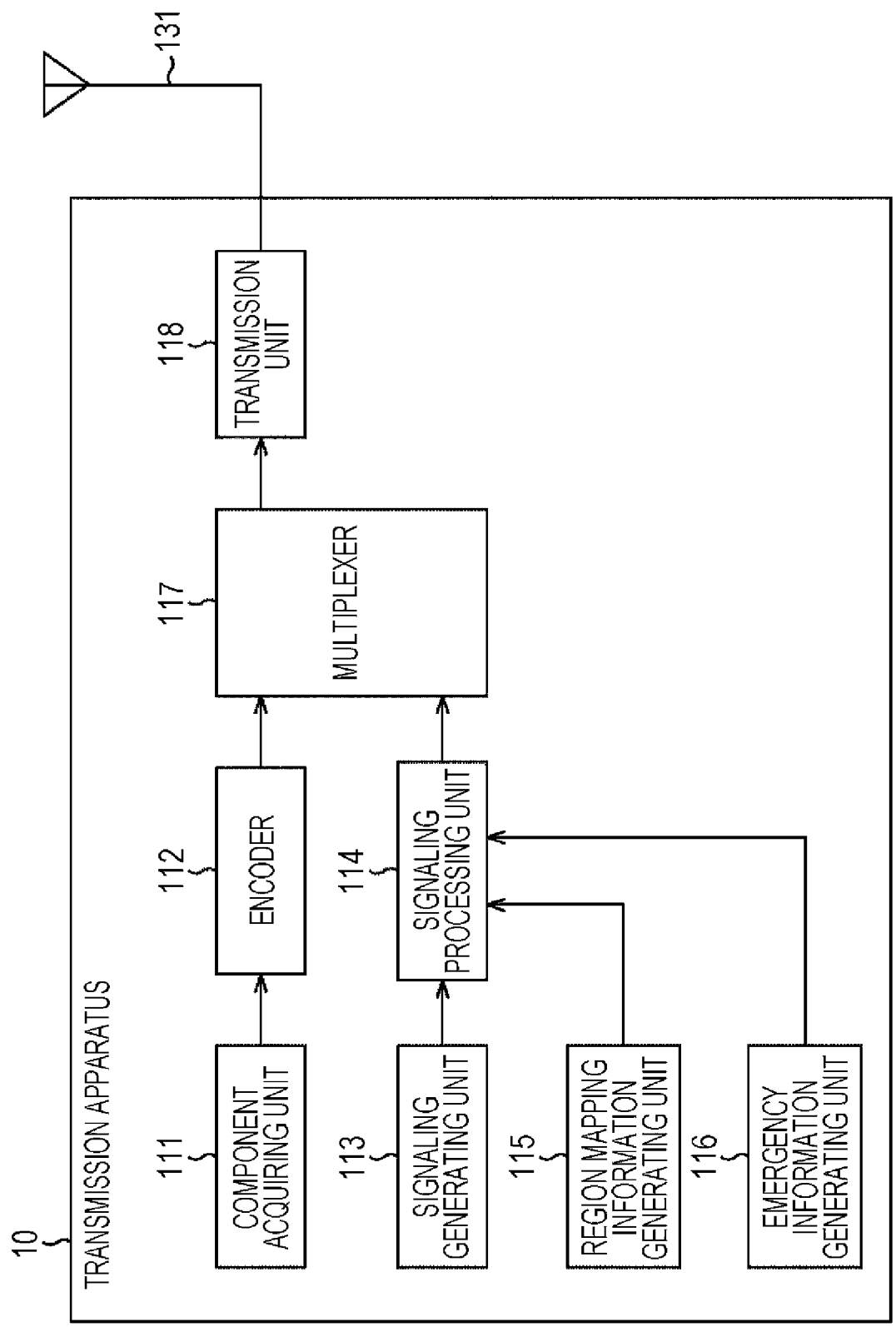

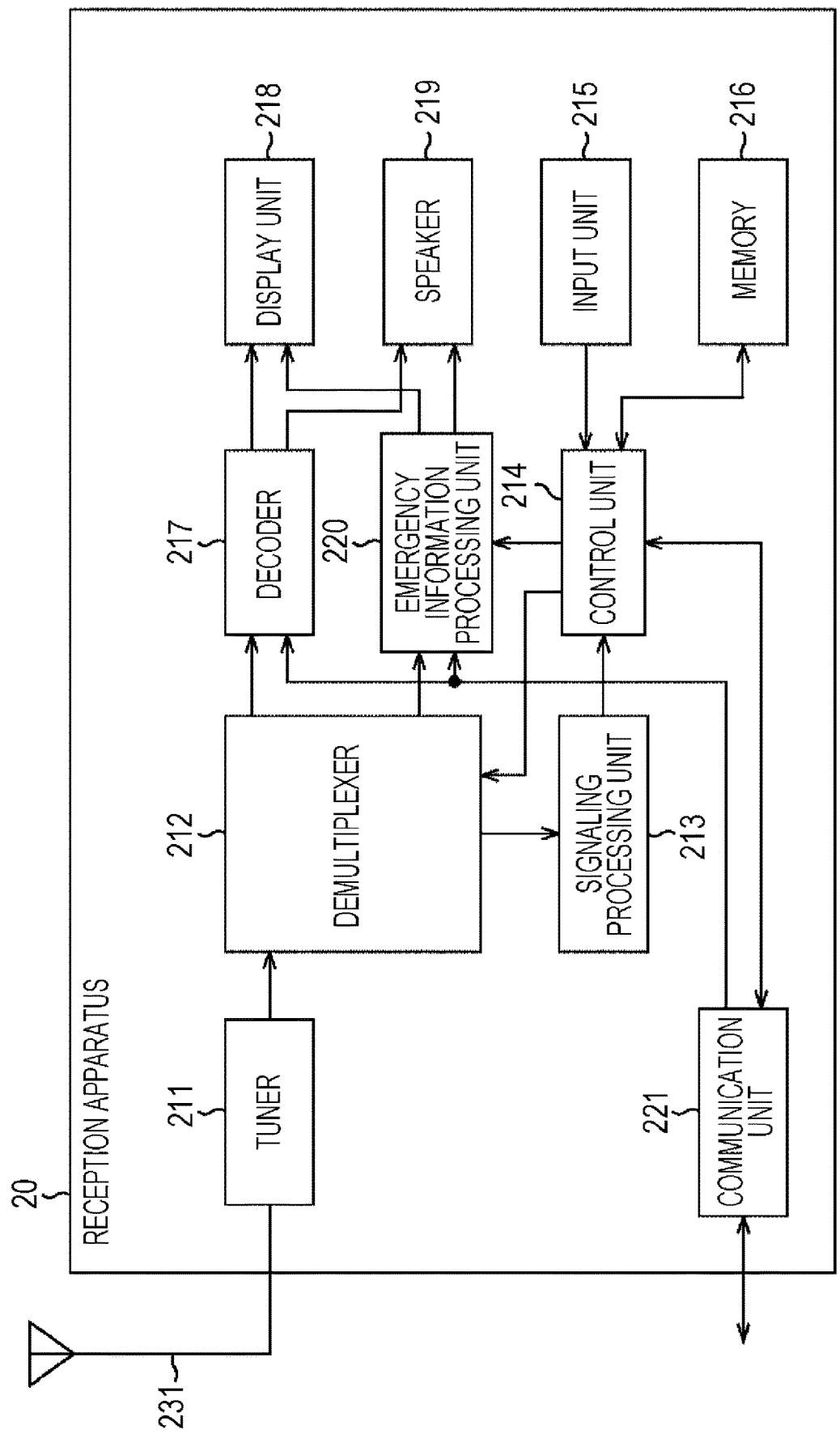

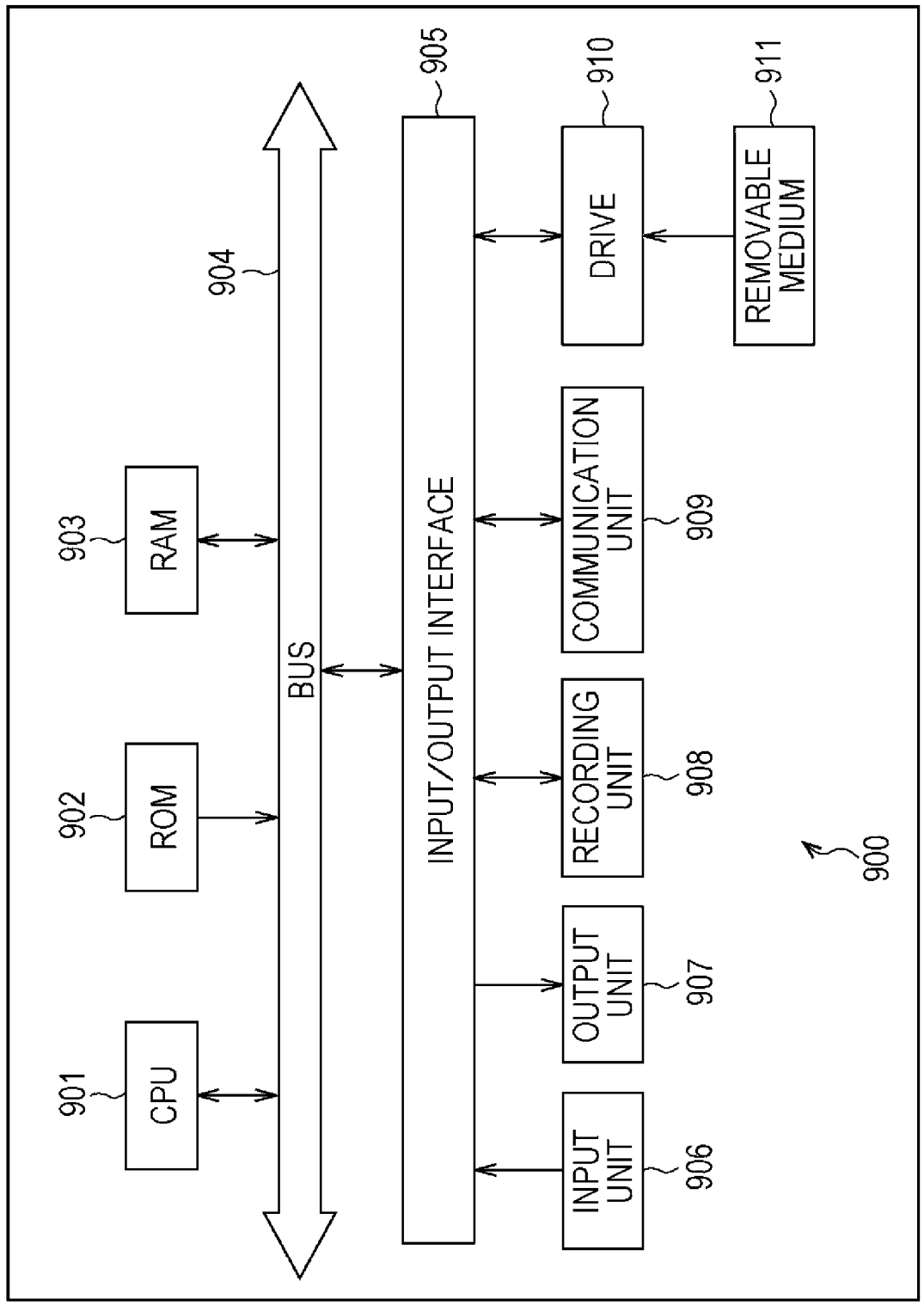

RECEPTION APPARATUS, RECEPTION METHOD, TRANSMISSION APPARATUS, AND TRANSMISSION METHOD

TECHNICAL FIELD

The present technology relates to a reception apparatus, a reception method, a transmission apparatus, and a transmission method, and more particularly, to a reception apparatus, a reception method, a transmission apparatus, and a transmission method capable of giving a notification of useful emergency information.

CROSS REFERENCE TO RELATED APPLICATIONS

This application claims the benefit of Japanese Priority Patent Application JP 2015-076733 filed Apr. 3, 2015, the entire contents of which are incorporated herein by reference.

BACKGROUND ART

Currently, in digital broadcast standards of each country, a Moving Picture Experts Group phase 2-Transport Stream (MPEG2-TS) system is employed as a transmission system (for example, see Non Patent Literature 1). In the future, by introducing an IP transmission system in which an Internet Protocol (IP) packet used in the field of communications is used for digital broadcasting, a more advanced service is assumed to be provided.

For example, in Advanced Television Systems Committee (ATSC) 3.0 that is one of next generation digital broadcasting standards, an IP packet including not a Transport Stream (TS) packet but a UDP/IP, in other words, a User Datagram Protocol (UDP) packet is determined to be used for data transmission.

CITATION LIST

Non Patent Literature

NPL 1: ARIB STD-B10 Ed. 5.4, Association of Radio Industries and Businesses

SUMMARY OF INVENTION

Technical Problem

Meanwhile, it is requested to notify emergency information such as a weather alert as one request for digital broadcasting. However, in a case where the IP transmission system is introduced as a transmission system of digital broadcasting, a technology system for giving a notification of only useful emergency information among various kinds of emergency information has not been established.

It is desirable to be capable of giving a notification of useful emergency information.

Solution to Problem

A reception apparatus according to one embodiment of the present technology includes circuitry configured to receive region mapping information that includes at least one target region identifier and, for each of the at least one target region identifier, location information associated with the respective target region identifier. The circuitry is further configured to control filtering such that emergency information for a location associated with the reception apparatus is acquired based on the region mapping information.

The reception apparatus according to one embodiment of the present technology may be either an independent apparatus or an internal block configuring one apparatus. A reception method according to one embodiment of the present technology is a reception method corresponding to the reception apparatus according to the one embodiment of the present technology described above. For example, a method of a reception apparatus for acquiring emergency information includes receiving, by circuitry of the reception apparatus, region mapping information that includes at least one target region identifier and, for each of the at least one target region identifier, location information associated with the respective target region identifier. The method further including controlling, by the circuitry, filtering such that the emergency information for a location associated with the reception apparatus is acquired based on the region mapping information.

In the reception apparatus and the reception method according to the one embodiment of the present technology, region mapping information that includes at least one target region identifier and, for each of the at least one target region identifier, location information associated with the respective target region identifier is received, and control of filtering is executed such that emergency information for a location associated with the reception apparatus is acquired based on the region mapping information.

A transmission apparatus according to another embodiment of the present technology includes circuitry configured to generate region mapping information that includes at least one target region identifier and, for each of the at least one target region identifier, location information associated with the respective target region identifier. The circuitry is configured to receive content and transmit the content and the region mapping information. Further, the circuitry is configured to transmit the emergency information when an emergency in a region represented by one of the at least one target region identifier occurs.

The transmission apparatus according to another embodiment of the present technology may be either an independent apparatus or an internal block configuring one apparatus. A transmission method according to the another embodiment of the present technology is a transmission method corresponding to the transmission apparatus according to the another embodiment of the present technology described above. For example a method of a transmission apparatus for transmitting emergency information includes generating, by circuitry of the transmission apparatus, region mapping information that includes at least one target region identifier and, for each of the at least one target region identifier, location information associated with the respective target region identifier. The method includes receiving content and transmitting, by the circuitry, the content and the region mapping information. The method further includes transmitting, by the circuitry, the emergency information when an emergency in a region represented by one of the at least one target region identifier occurs.

In the transmission apparatus and the transmission method according to the another embodiment of the present technology, region mapping information that includes at least one target region identifier and, for each of the at least one target region identifier, location information associated with the respective target region identifier is generated, a content is received, and the content and the region mapping information are transmitted. Further, the emergency information is transmitted when an emergency in a region represented by one of the at least one target region identifier occurs.

Advantageous Effects of Invention

According to one embodiment and another embodiment of the present technology, useful emergency information can be notified.

The effects are not limited effects described here, and may be any one of effects described in the present disclosure.

BRIEF DESCRIPTION OF DRAWINGS

FIG. 4 is a diagram that illustrates an example of region mapping information.

FIG. 7 is a diagram that illustrates a detailed content of the LLS header.

FIG. 11 is a diagram that illustrates an example of syntax of an ADT.

FIG. 12 is a diagram that illustrates an example of the syntax of an EAT.

FIG. 13 is a diagram that illustrates an example of the configuration of a transmission apparatus.

FIG. 14 is a diagram that illustrates an example of the configuration of a reception apparatus.

FIG. 19 is a diagram that illustrates an example of the configuration of a computer.

DESCRIPTION OF EMBODIMENTS

Hereinafter, an embodiment of the present technology will be described with reference to the drawings. The description will be presented in the following order.

1. Configuration of System
2. Overview of Emergency Information Filtering Function
3. Operation Example
4. Example of Syntax
5. Configuration of Each Apparatus
6. Flow of Process Executed by Each Apparatus
7. Modified Example
8. Configuration of Computer 1. <Configuration of System>

(Example of Configuration of Transmission System)

Figure 1:
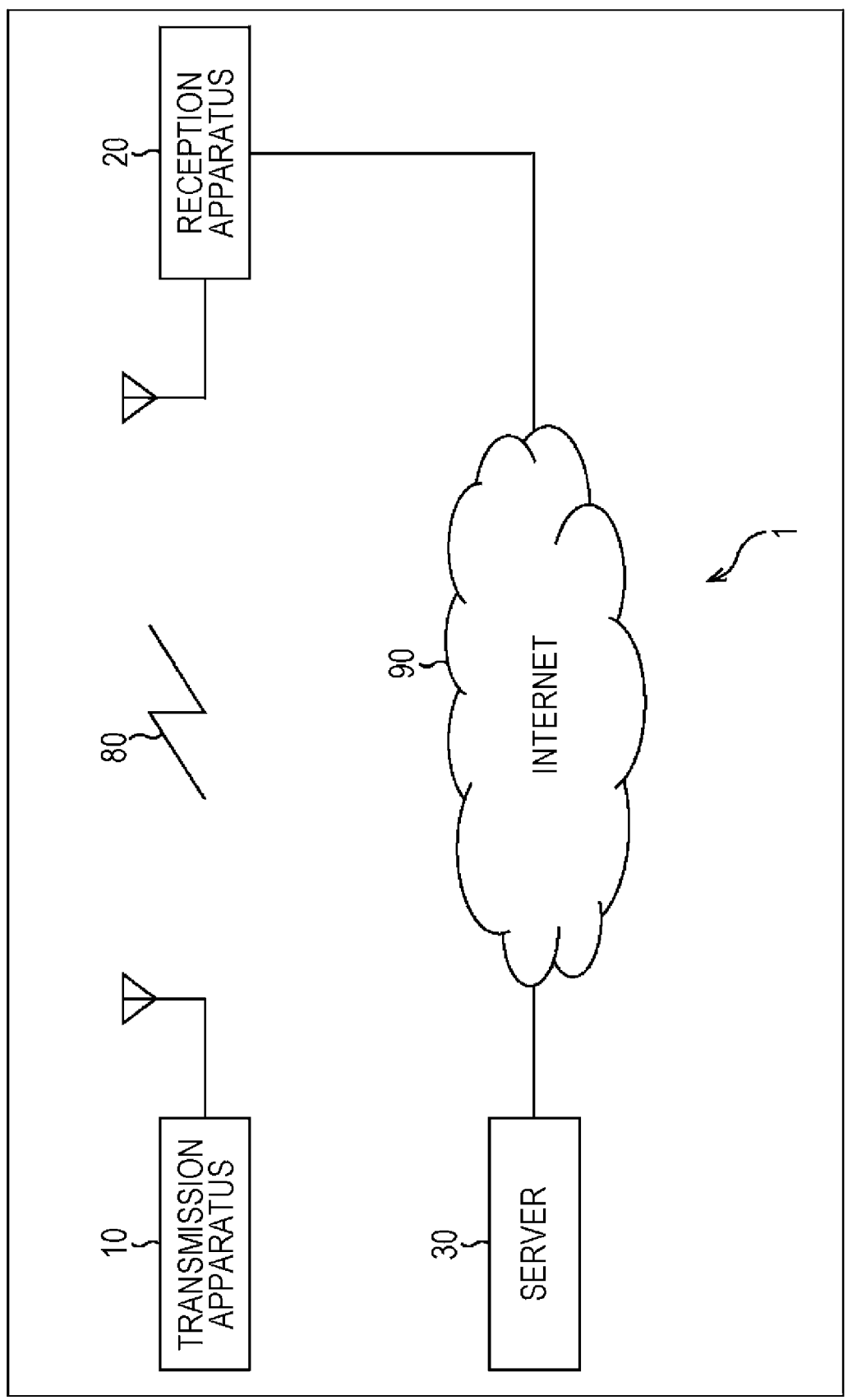
FIG. 1 is a diagram that illustrates an example of the configuration of a transmission system.

A transmission system 1 illustrated in FIG. 1 is a system for providing a digital broadcasting service. The transmission system 1 is configured by: a transmission apparatus 10; a reception apparatus 20; and a server 30. In the configuration illustrated in FIG. 1, the reception apparatus 20 and the server 30 are interconnected through the Internet 90.

The transmission apparatus 10 is a transmitter that is compliant with a predetermined standard of digital broadcast and is provided by a service provider (broadcaster). In an embodiment of the present technology, as a digital broadcast standard, for example, a standard such as ATSC 3.0 or the like may be employed.

The transmission apparatus 10 transmits a stream of components such as a video, an audio, and a subtitle configuring a content provided as a service through a transmission channel 80 using a broadcast wave of digital broadcast together with signaling data. Here, a service, for example, is a compilation of contents (television programs) produced by a service provider. In addition, the signaling data is control information that is necessary for viewing a content configured by components such as a video, an audio, and the like.

The reception apparatus 20, for example, is a receiver that is compliant with a predetermined standard of digital broadcast such as ATSC 3.0 and is a fixed receiver such as a television receiver, a set-top box, or a recorder or a mobile receiver such as a smartphone, a cellular phone, a tablet computer, a notebook computer, or a terminal used in a vehicle.

The reception apparatus 20 receives a broadcast wave of digital broadcast transmitted from the transmission apparatus 10 through the transmission channel 80 and acquires signaling data transmitted using the broadcast wave of the digital broadcast. The reception apparatus 20 makes a connection to a stream of a content (components configuring the content) transmitted using the broadcast wave of the digital broadcast transmitted from the transmission apparatus 10 based on the signaling data and reproduces (outputs) a video and an audio of the content acquired from the stream.

The server 30 executes streaming distribution of a stream of components such as a video, an audio, and the like configuring a content through the Internet 90 in response to a request from the reception apparatus 20. In addition, the server 30 distributes signaling data (SLS signaling data to be described later) through the Internet 90 in response to a request from the reception apparatus 20.

Furthermore, in addition to the signaling data, the server 30, for example, may distribute various kinds of data such as an application, a web page, or an electronic service guide (ESG) in response to a request from the reception apparatus 20 through the Internet 90.

The reception apparatus 20 has a communication function and can access the server 30 through the Internet 90. The reception apparatus 20 makes a connection to a stream of a content (components configuring the content) distributed in a streaming manner from the server 30 through the Internet 90 based on the signaling data transmitted from the transmission apparatus 10 or the server 30 and reproduces (outputs) a video and an audio of the content acquired from the stream.

In FIG. 1, for the convenience of description, while only one reception apparatus is illustrated, actually, a plurality of reception apparatuses 20 are arranged and receive a content that is simultaneously distributed in a broadcasting manner from the transmission apparatus 10. As the transmission channel 80, in addition to a ground wave, a satellite link, a cable television network (wired line), or the like may be used.

In ATSC 3.0 that is currently formulated, as signaling data, Link Layer Signaling (LLS) signaling data and Service Level Signaling (SLS) signaling data are defined, and the SLS signaling data for each service is acquired based on information described in the LLS signaling data that is acquired in advance.

Here, as the LLS signaling data, for example, LLS metadata such as a Fast Information Table (FIT), an Emergency Alerting Table (EAT), an Area Definition Table (ADT), and a Region Rating Table (RRT) is included. The FIT includes information representing the configuration of a stream or a service in a broadcast network such as information (channel selection information) that is necessary for channel selection of a service. The EAT includes information (emergency information) relating to an emergency alert. The ADT includes a region mapping information to be described later. The RRT includes information relating to a rating. In addition, the LLS signaling data is transmitted in a layer lower than an IP layer of a protocol stack of ATSC 3.0.

As the SLS signaling data, for example, SLS metadata such as a User Service Description (USD), a Media Presentation Description (MPD), and an LCT Session Instance Description (LSID) is included. The USD includes information such as an acquisition destination of another metadata. The MPD is control information used for managing the reproduction of a stream of components. The LSID is control information of a Real-time Object Delivery over Unidirectional Transport (ROUTE) protocol. In addition, the ROUTE is a protocol extending File Delivery over Unidirectional Transport (FLUTE) that is a protocol appropriate for multicast transmission of a binary file in one direction. The SLS signaling data is transmitted in a layer that is upper than the IP layer of the protocol stack of ATSC 3.0.

2. <Overview of Emergency Information Filtering Function>

As one of requests for digital broadcast using an IP transmission system employed in the ATSC 3.0 or the like, it is requested to give a notification of emergency information (emergency notification information) such as a weather alert. Here, in a case where various kinds of emergency information are notified using digital broadcast that uses the IP transmission system, in a range in which a broadcast wave can be received from a broadcasting station (the transmission apparatus 10 thereof), it is assumed that information that is valid only in a limited region is included.

For example, since the target region and the content of the emergency information cover a wide range of areas from a weather alert relating to a broad region of some degree to delay information of a commuting bus relating to a specific narrow region, there is a possibility that not only useful information but also unnecessary information for a user using the reception apparatus 20 is included in the emergency information. In addition, in a case where information up to information relating to a specific narrow region such as delay information of a commuting bus is included in the emergency information, there is a possibility that the amount of information to be processed by the reception apparatus 20 side is very large.

In other words, since information relating to a reception position is limited, for the purpose of displaying (presenting) useful information for a user and reducing the process of the reception apparatus 20, it is effective for the user using the reception apparatus 20 to exclude unnecessary information by filtering emergency information transmitted from the broadcasting station (the transmission apparatus 10 thereof) in units of regions. Thus, the present technology proposes an emergency information filtering function in units of regions.

(Emergency information Filtering Function)

Figure 2:
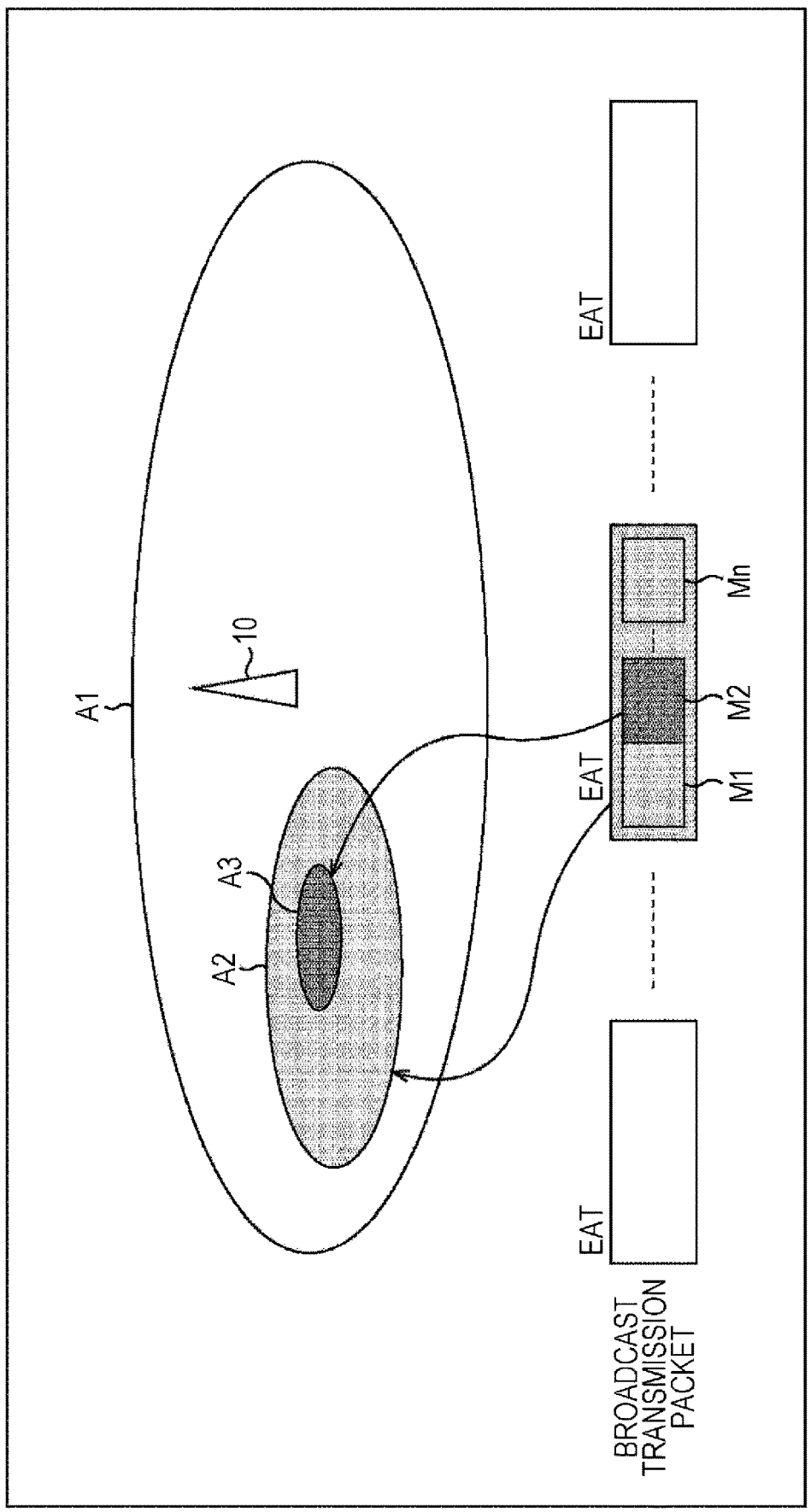
FIG. 2 is a diagram that schematically illustrates a relation between regions and filtering.

FIG. 2 is a diagram that illustrates an emergency information filtering function in units of regions according to an embodiment of the present technology.

In the case illustrated in FIG. 2, a broadcast wave transmitted from a transmission apparatus 10 of a broadcasting station is assumed to be receivable by a reception apparatus 20 disposed inside a service region A1. Accordingly, in the case of emergency, the transmission apparatus 10 of the broadcasting station can notify a plurality of reception apparatuses 20 disposed inside the service region A1 of emergency information. In the example illustrated in FIG. 2, the transmission apparatus 10 transmits a packet (LLS packet) including an EAT as a broadcast transmission packet.

Here, in a case where the emergency information notified from the transmission apparatus 10 is information that is valid only in a region inside the Emergency Alerting (EA) target region A2, while the emergency information is useful information for a user using a reception apparatus 20 inside the EA target region A2, the emergency information is unnecessary information for a user using a reception apparatus 20 outside the EA target region A2.

In such a case, by configuring a packet storing the EAT including the emergency information to include a code (target region tag (target region code)) designating the EA target region A2, the reception apparatus 20 can determine whether or not the EAT (the emergency information included therein) stored in the packet has the EA target region A2 as its target based on whether a reception position (hereinafter, referred to as a reception site) of a broadcast wave transmitted from the transmission apparatus 10 corresponds to a target region tag included in the packet storing the EAT.

In other words, the reception apparatus 20 can execute filtering (hereinafter, referred to also as packet filtering) of a packet level in units of regions and extract only useful emergency information by excluding unnecessary emergency information at the reception site. In this way, for a user using the reception apparatus 20 inside the EA target region A2, only useful emergency information relating to the EA target region A2 is displayed (presented).

In a case where the reception apparatus 20 is a fixed receiver such as a television receiver although the position is a reception site of the reception apparatus 20, for example, a region code or the like set by the user at the time of initial scanning or the like may be used. On the other hand, in a case where the reception apparatus 20 is a mobile receiver such as a smartphone, position information (geo-location information) represented by a reception signal received from a positing satellite of a GPS (Global Positioning System) or the like may be used.

In addition, while there are cases where a plurality of messages are described in the EAT as emergency information, by further excluding unnecessary emergency information at the reception site by further executing filtering (hereinafter, referred to also as message filtering) of a message level in units of regions (EA target detailed regions) that are detailed regions more than the EA target regions, only further useful emergency information may be extracted.

For example, as illustrated in FIG. 2, in a case where emergency information messages M1 to Mn are described in an EAT, it will be considered that the emergency information message M1 has a region other than an EA target detailed region A3 inside an EA target region A2 as its target, and the emergency information message M2 has the EA target detailed region A3 inside the EA target region A2 as its target.

At this time, a reception apparatus 20 disposed inside the EA target detailed region A3 extracts only the emergency information message M2 by executing message filtering. Accordingly, for a user using the reception apparatus 20 inside the EA target detailed region A3, only useful emergency information relating to the EA target detailed region A3 is displayed (presented).

In addition, in a case where the emergency information message M2 is displayed in a reception apparatus 20 disposed inside the EA target detailed region A3 with a high priority level, for example, the emergency information message M1 may be configured to be displayed with a lowered priority level by using neighboring emergency information or the like. On the other hand, in a reception apparatus 20 disposed inside a region other than the EA target detailed region A3, by executing message filtering, the emergency information message M1 is displayed with a high priority level.

As described above, according to the emergency information filtering function in units of regions according to an embodiment of the present technology, by executing emergency information filtering of two stages according to packet filtering and message filtering, a user using the reception apparatus 20 is notified of only useful information at the reception site.

As described above, as the reception site (location information) of the reception apparatus 20, for example, various formats such as a region code set by a user, position information (geo-location information) represented by a reception signal transmitted from a GPS, and the like may be considered to be used. Here, in order to execute filtering in units of regions, it is necessary that location information such as the region code or the geo-location information and a target region tag associated with the emergency information have a common ID system.

(Mapping Between Region Code And Geo-Location Information For Each EA Target Region)

Figure 3:
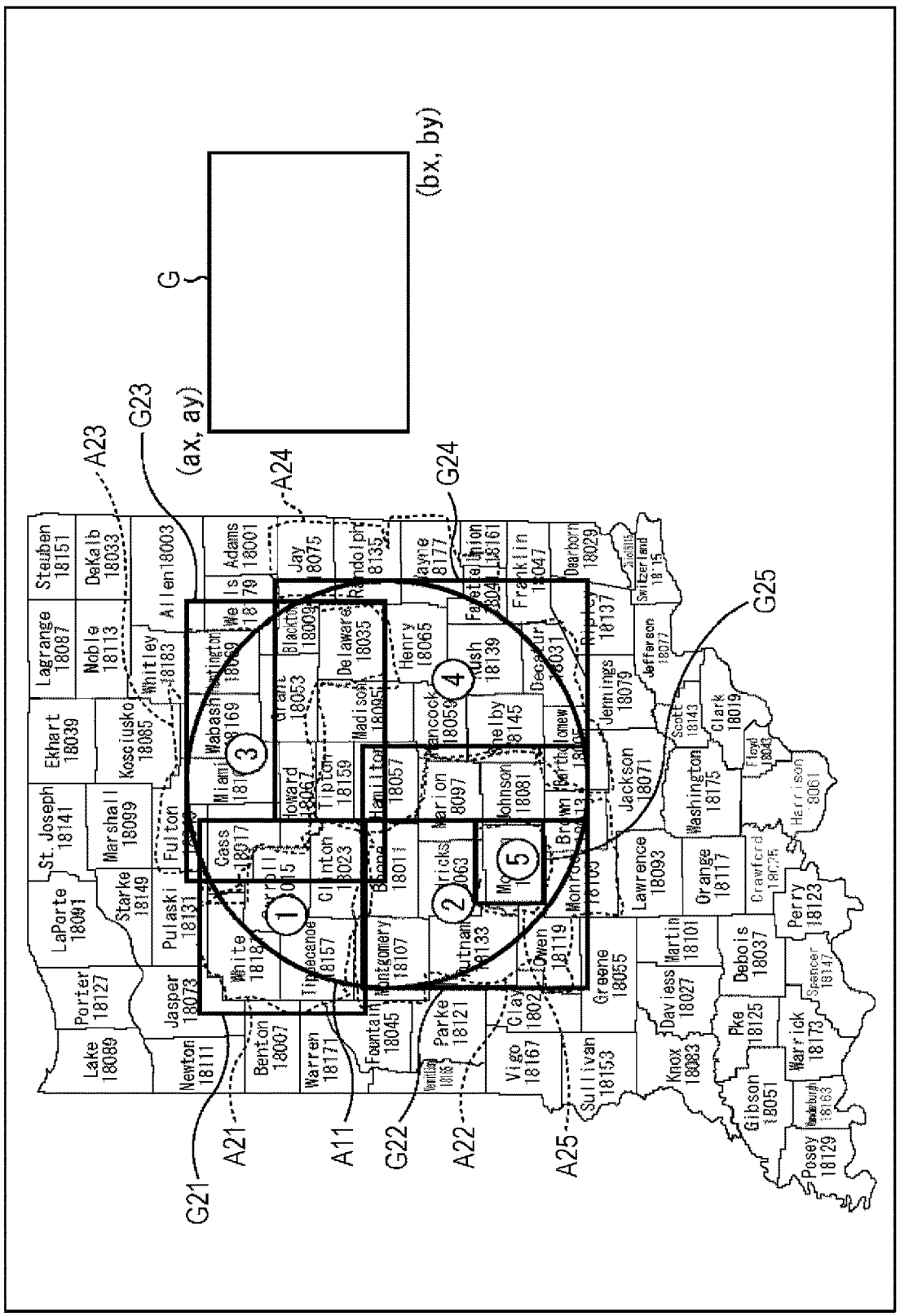
FIG. 3 is a diagram that illustrates a relation between regions to which region codes are assigned and areas represented by target region tags and geo-locations.

FIG. 3 illustrates region codes assigned to counties in the Indiana state of the United States as an example of the assignment of a code to each region. The region code assigned to each county is defined as a county code of Federal Information Processing Standard (FIPS) by the federal government of the United States.

As illustrated in FIG. 3, at the center of a service region A11, a broadcasting station (a transmission apparatus 10 thereof) is disposed, and a plurality of reception apparatuses 20 disposed inside the service region A11 can receive a broadcast wave transmitted from the transmission apparatus 10.

Here, when focusing on some regions of the Indiana state, for each region that is a target for emergency information, each county can be divided into five areas of EA target regions A21 to A25. Each of the EA target regions A21 to A25 is configured by one or a plurality of counties (EA target detailed regions). In addition, the EA target regions A21 to A25 are respectively associated with geo-locations G21 to G25 represented as rectangles each formed by a north west point (ax, ay) and a south east point (bx, by).

When a relation among the EA target regions (target region tags), the EA target detailed regions (region codes), and the geo-location information is represented more specifically, for example, it is represented as in FIG. 4.

In other words, the EA target region A21 represented by a target region tag of "0x0001" is configured by White County of a region code "18181", a Carroll County of a region code "18015", a Tippe Canoe County of a region code "18157", and Clinton County of a region code "18023". In addition, the EA target region A21 represented by "1" in FIG. 3 is associated with a geo-location G21 designated by the longitudes and the latitudes of a north west point represented by (a1x, a1y) and a south east point represented by (b1x, b1y).

The EA target region A22 represented by a target region tag of "0x0002" is configured by Montgomery County of a region code "18107", Boone County of a region code "18011", Putnam Country of a region code "18133", Hendricks County of a region code "18063", Marion County of a region code "18097", Owen County of a region code "18119", Monroe County of a region code "18105", Brown County of a region code "18013", Johnson County of a region code "18081", and Morgan County of a region code "18109".

The EA target region A22 represented by "2" in FIG. 3 is associated with a geo-location G22 designated by the longitudes and the latitudes of a north west point represented by (a2x, a2y) and a south east point represented by (b2x, b2y).

The EA target region A23 represented by a target region tag of "0x0003" is configured by Fulton County of a region code "18049", Cass County of a region code "18017", Miami County of a region code "18103", Wabash County of a region code "18169", Howard County of a region code "18067", Grant County of a region code "18053", Huntington County of a region code "18069", Blackford County of a region code "18009", and Delaware County of a region code "18035".

The EA target region A23 represented by "3" in FIG. 3 is associated with a geo-location G23 designated by the longitudes and the latitudes of a north west point represented by (a3x, a3y) and a south east point represented by (b3x, b3y).

The EA target region A24 represented by a target region tag of "0x0004" is configured by Tipton County of a region code "18159", Hamilton County of a region code "18057", Madison County of a region code "18095", Henry County of a region code "18065", Jay County of a region code "18075", Randolph County of a region code "18135", Wayne County of a region code "18177", Fayette County of a region code "18041", Rush County of a region code "18139", Hancock County of a region code "18059", Shelby County of a region code "18145", Bartholomew County of a region code "18005", and Decatur County of a region code "18031".

The EA target region A24 represented by "4" in FIG. 3 is associated with a geo-location G24 designated by the longitudes and the latitudes of a north west point represented by (a4x, a4y) and a south east point represented by (b4x, b4y).

The EA target region A25 represented by a target region tag of "0x0005" is configured by Morgan County of a region code "18109". The EA target region A25 represented by "5" in FIG. 3 is associated with a geo-location G25 designated by the longitudes and the latitudes of a north west point represented by (a5x, a5y) and a south east point represented by (b5x, b5y).

As described above, for each target region tag, by defining region mapping information mapping a region code and geo-location information, a target region tag associated with emergency information and location information such as a region code or geo-location information can be associated with each other. Accordingly, the reception apparatus 20 can execute emergency information filtering in units of regions such as packet filtering or message filtering by using the region mapping information.

For example, as the reception site (location information) of the reception apparatus 20, a region code set by the user or position information (geo-location information) represented by a reception signal received from a GPS is acquired. Accordingly, the reception apparatus 20 converts the region code or the geo-location information into a target region tag by using the region mapping information. Accordingly, also in a case where a target region tag designating an EA target region is included in a packet storing an EAT including emergency information, the reception apparatus 20 can execute emergency information filtering such as packet filtering by using the target region tag acquired by converting the region code or the geo-location information.

In other words, in the reception apparatus 20, while various formats such as a region code and geo-location information are considered to be used as the reception site (location information), by defining the region mapping information, emergency information filtering can be executed for both the region code and the geo-location information.

The region codes, for example, are defined as county codes of federal information processing standards (FIPS). Thus, a case may be considered in which an EA target region identified by a target region tag, which the service provider side notifies of emergency information, is different from a county (for example, an EA target detailed region) identified by a region code. More specifically, in a case where emergency information is notified to the EA target region A21 that is configured by White County ("18181"), Carroll County ("18015"), Tippe Canoe County ("18157"), and Clinton County ("18023"), the notification area is not one county (EA target detailed region) and thus is not representable by using a region code (a county code of the FIPS).

In such a case, after giving a notification of the region mapping information (FIG. 4) to the reception apparatus 20, the transmission apparatus 10 provided by the service provider configures a packet storing an EAT including emergency information to include a target region tag ("0×0001") designating an EA target region A21 in the case of emergency, and thus, the reception apparatus 20 disposed inside the EA target region A21 can execute emergency information filtering in units of regions and notify the user of useful emergency information.

In this way, by supplying the region mapping information defined by the service provider to the reception apparatus 20 side prior to emergency information that is notified in the case of emergency, the service provider can freely set an EA target region to which the emergency information is to be notified and execute a more flexible operation without being tied up with various rules of county codes of the federal information processing standards (FIPS) and the like. In other words, the region mapping information can be regarded as information associating the emergency information and information relating to regions with each other.

The region mapping information illustrated in FIG. 4 is an example, and, in a case where another format other than the region code and the geo-location information is used as the reception site (location information) of the reception apparatus 20, region mapping information that is appropriate for the another format can be used. In the region mapping information illustrated in FIG. 4, while a target region tag is associated with both a region code and geo-location information, at least one of the region code and the geo-location information may be associated therewith.

In the case illustrated in FIG. 3, while it is preferable that areas represented by the EA target regions A21 to A25 and areas represented by the geo-locations G21 to G25 coincide with each other, practically, in a case where it is difficult to configure such areas to coincide with each other, a deviation of some degree may be allowed.

(Structure of LLS Packet)

Figure 5:
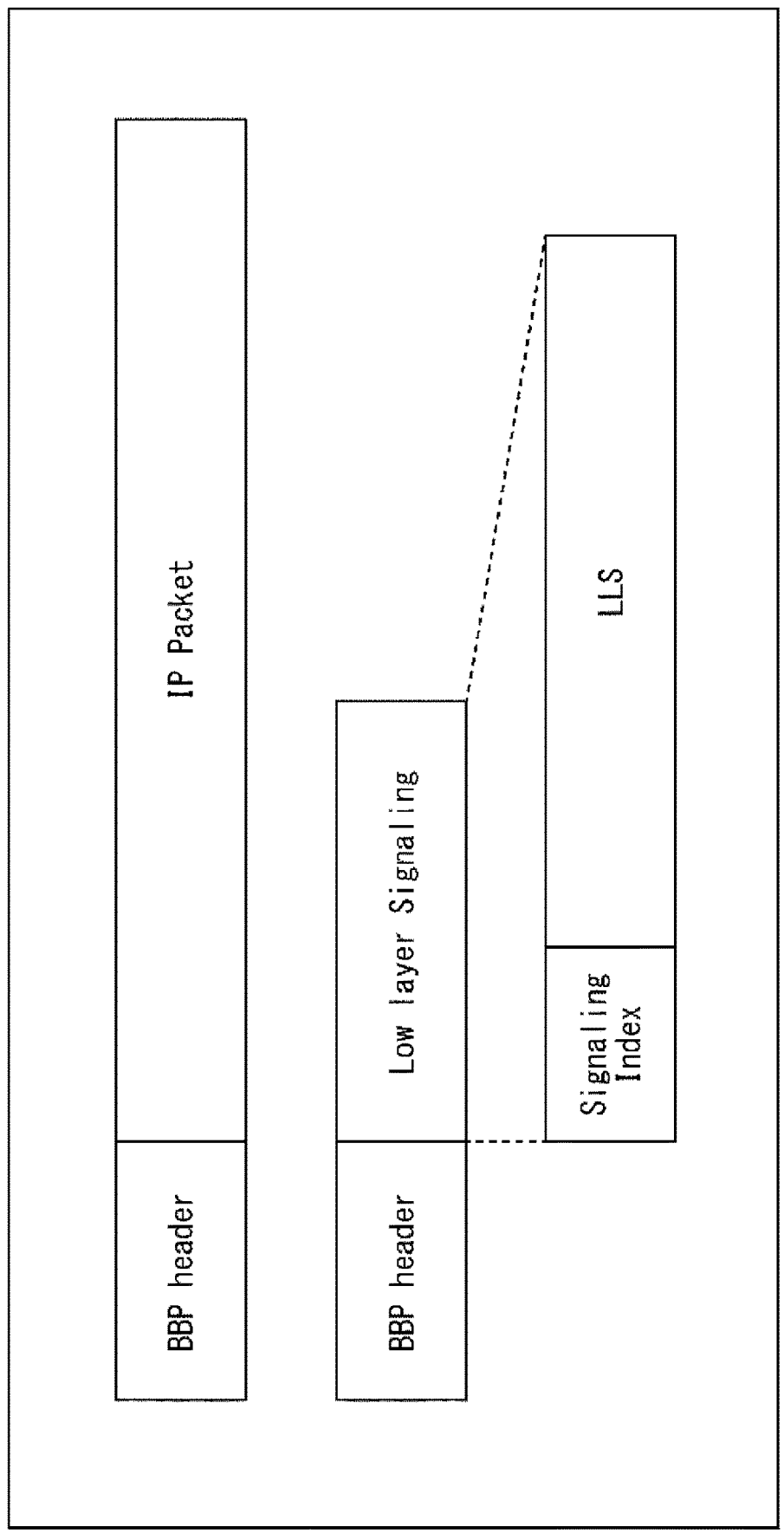
FIG. 5 is a diagram that illustrates an example of an LLS packet.

FIG. 5 illustrates the configuration of a BBP packet storing an IP packet or LLS signaling data.

The BBP packet is configured by a BBP header and a payload. In a case where ATCS 3.0 (IP transmission system) is employed, an IP packet and LLS signaling data are arranged in the payload of the BBP packet. In the BBP header, type information is included, and it can be determined whether the BBP packet is an IP packet or LLS signaling data based on the type information.

In a case where the LLS signaling data is arranged in the payload of the BBP packet, in this payload, an LLS packet configured by an LLS header and a payload is arranged. In this LLS packet, LLS signaling data is arranged in the payload, and at least LLS index information (Signaling Index) is arranged in the LLS header.

(Structure of LLS Header)

Figure 6:
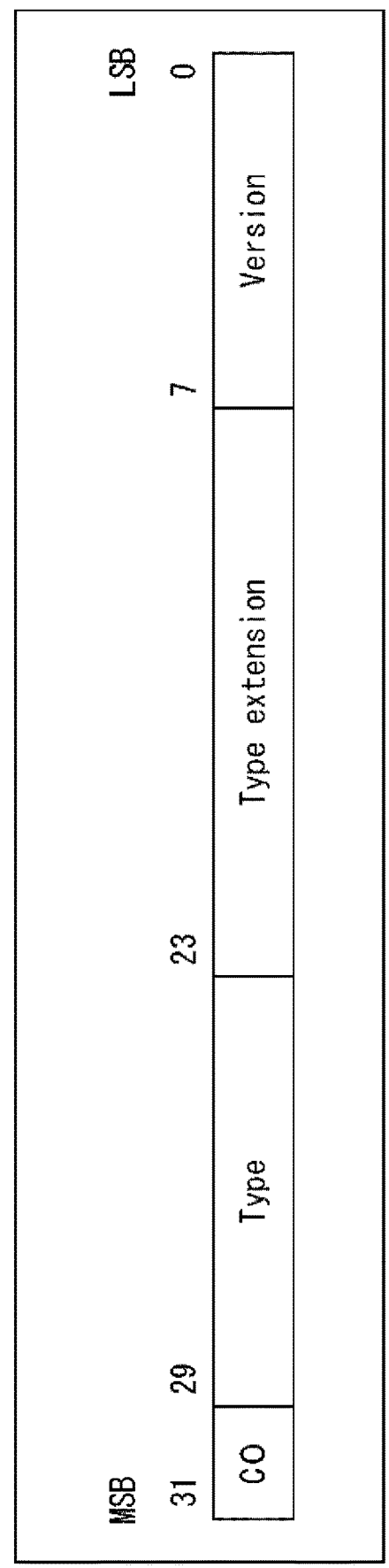
FIG. 6 is a diagram that illustrates an example of an LLS header.
Figures 8, 9:
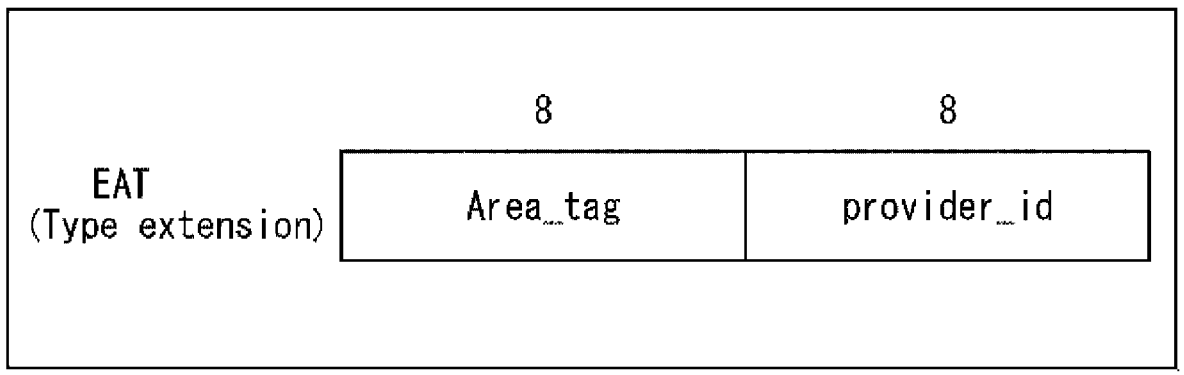
FIG. 8 is a diagram that illustrates an example of type information.
FIG. 9 is a diagram that illustrates the structure of extension information of an EAT.

FIG. 6 is a diagram that illustrates the structure of the LLS header (the LLS index information thereof). In FIGS. 7 to 9, each element configuring the LLS header illustrated in FIG. 6 is described, and description will be presented by appropriately referring to the drawings.

In the structure illustrated in FIG. 6, "CO", "Type", "Type extension", and "Version" are arranged in the LLS header having 32 bits.

"CO" of two bits from the most significant bit (MSB) is an abbreviation of "Compress" and is information (compression information) representing compression/no-compression of the target LLS signaling data. For example, as illustrated in FIG. 7, in the case of no compression, "0" is set to "CO". On the other hand, in a case where the LLS signaling data (a file thereof) is compressed according to zip, "1" is set thereto. In addition, in a case where the LLS signaling data (a file thereof) is compressed according to bim (Binary format for MPEG-7 data), "2" is set thereto. Furthermore, "3" is secured for a future extension.

Referring back to FIG. 6, "Type" having 6 bits arranged next to "CO" is information (type information) representing a type of the LLS signaling data. For example, in this type information, as illustrated in FIG. 8, in a case where all the LLS metadata (LLS package) is arranged, "0×00" is set as "Type". Similarly, to "Type", a value corresponding to the type of the LLS signaling data disposed in the payload of the LLS packet is set. Thus, "0×01" is set in a case where an FIT is disposed, "0×02" is set in a case where an RRT is arranged, "0×03" is set in a case where an EAT is arranged, and "0×04" is set in a case where an ADT is arranged.

Referring back to FIG. 6, "Type extension" having 16 bits arranged next to "Type" is an extended filtering parameter (extension information) set for each type of the LLS signaling data. To this extension information, arbitrary information corresponding to the type information may be set.

More specifically, for example, as illustrated in FIG. 9, in a case where Type="0×03", in other words, in a case where the EAT is set as the type information, a target region tag (Area tag) is assigned to high-order eight bits of the Type extension formed by 16 bits, and a provider ID (Provider id) is assigned to the remaining low-order eight bits. Here, as the target region tag, a target region tag corresponding to the EA target region A2, for example, "0×0001" or "0×0002" is set.

In addition, as a target region tag in the extension information, a specific bit array may be assigned to a specific function. For example, in a case where "0×00" is set as the target region tag, it represents that the entirety of a specific area of the service region A1 or the like is a target for the notification of emergency information, and, in a case where "0×FF" is set, it represents that an area other than a specific area of the service region A1 or the like is a target for emergency information. For example, by configuring "0×FF" to be settable as the target region tag, it can be operated such that a user using a reception apparatus 20 inside the service region A1 checks emergency information notified in an area other than the service region A1.

Furthermore, by configuring a service provider ID to be assignable to the extension information, the reception apparatus 20 can extract only emergency information notified from a specific service provider. Instead of the service provider ID, for example, a priority level (Priority) of 8 bits may be configured to be assigned. For example, by setting priority levels of four levels of "0" to "3" as the priority levels, the reception apparatus 20 can extract only emergency information having a higher priority level. In this example, as the value of a priority level is higher, the priority level is illustrated to be higher.

In this way, while the EAT includes emergency information, the emergency information may not be determined to be useful information for all the users depending on the region of the target and the service provider, the degree of emergency, and the like thereof. Accordingly, by setting a filtering condition to be extended by using the extension information, the reception apparatus 20 can extract only useful information.

Referring back to FIG. 6, "Version" that is eight bits from the least significant bit (LSB) arranged next to "Type extension" is information (version information) representing the version of the LLS signaling data.

As the LLS index information, it is not necessary to arrange all the compression information (CO), the type information (Type), the extension information (Type extension), and the version information (Version), but at least one type of information (for example, the type information and the extension information) among such information may be arranged according to a filtering condition. Here, the compression information (CO), the type information (Type), the extension information (Type extension), and the version information (Version) are examples of the LLS index information, and any other parameter may be defined as long as the parameter can be used for a filtering process of the LLS signaling data.

As above, the LLS header defines the LLS index information that is configured by the compression information (CO), the type information (Type), the extension information (Type extension), and the version information (Version). Accordingly, the reception apparatus 20 can acquire LLS signaling data by executing the filtering process of the LLS packet by using the LLS index information of the LLS header.

3. <Operating Example>

(Emergency Information Message Transmission in Start-up State)

Figure 10:
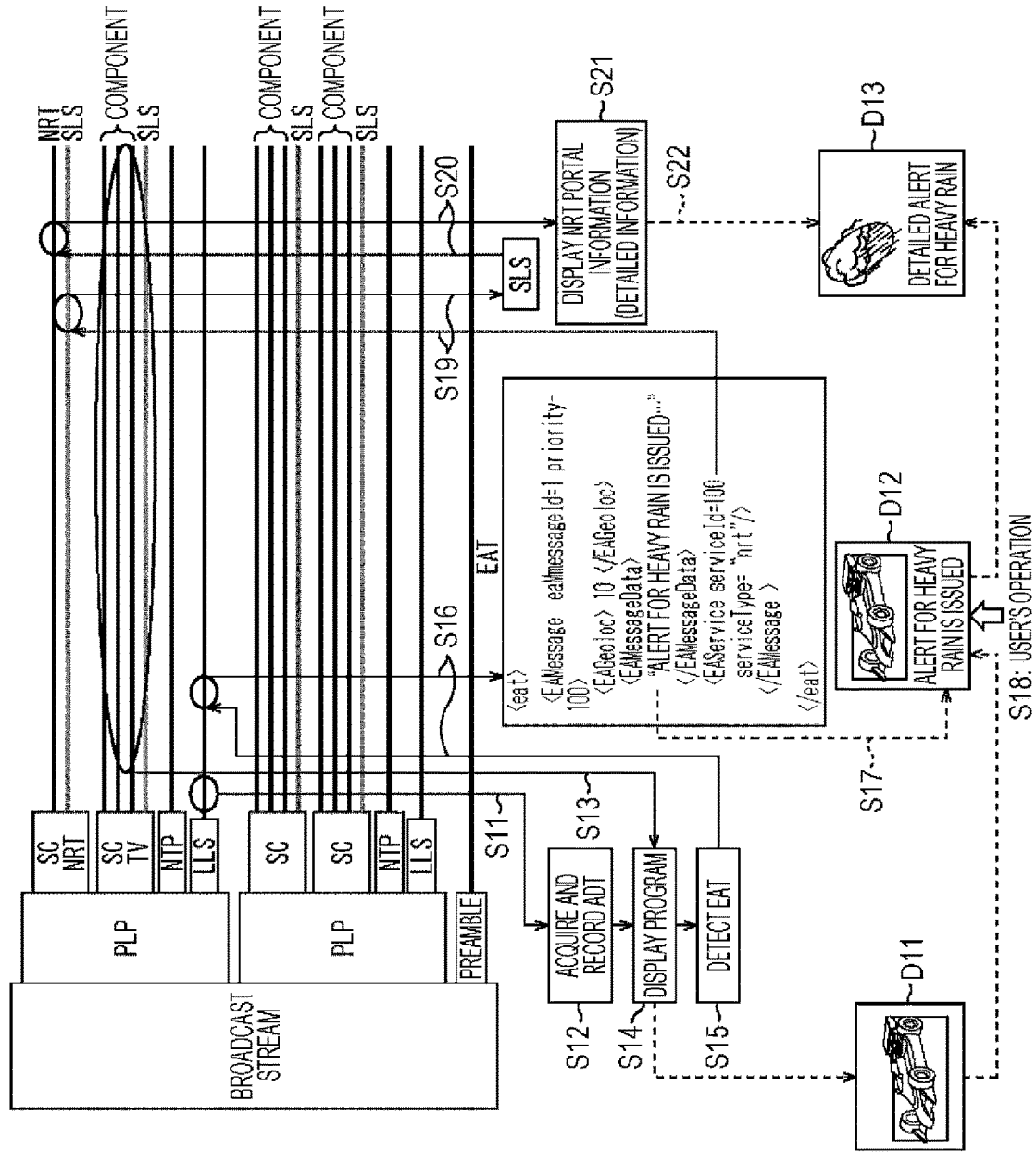
FIG. 10 is a diagram that illustrates an operation example.

Next, a specific operating example will be described with reference to FIG. 10. FIG. 10 is a diagram that illustrates emergency information message transmission of a case where a reception apparatus 20 is started up.

In FIG. 10, the upper side illustrates the flow of data transmitted (transferred) from a transmission apparatus 10, and the lower side illustrates the flow of the process executed by the reception apparatus 20 processing the data. In FIG. 10, the direction of time is assumed to be a direction from the left side to the right side.

In the flow illustrated in FIG. 10, the transmission apparatus 10 installed to a broadcasting station transmits a broadcast wave (broadcast stream) of digital broadcast using an IP transmission system. In this broadcast wave, for each Physical Layer Pipe (PLP), components and a stream of SLS configuring one or a plurality of services (SC: Service Channel), an NTP stream, and an LLS stream are transmitted. In a preamble (Preamble), control information defined in a physical layer is transmitted.

As illustrated in FIG. 10, the reception apparatus 20 acquires an ADT transmitted in an LLS stream through an initial scanning process or the like, and region mapping information included in the ADT is recorded in a memory such as an non-volatile RAM (NVRAM) (S11 and S12).

In addition, in the reception apparatus 20, channel selection information acquired from an FIT is recorded in the memory at the time of executing the initial scanning process, and accordingly, in a case where a channel selection operation of a service is executed by a user, a channel selection process of a service of which the channel is selected is executed, and a video of a television program is displayed (S13, S14, and D11).

Here, the reception apparatus 20 displaying the television program executes packet filtering by constantly monitoring a packet (LLS packet) storing an EAT transmitted in an LLS stream, and, in a case where an EAT targeted for an EA target region A2 including a reception site is detected, the EAT is acquired (S15 and S16).

In this packet filtering, the LLS header of the LLS packet is monitored, and, in a case where the type information (Type) represents the EAT, and the reception site is included in an EA target region represented by a target region tag (Area tag) arranged in the extension information (Type extension), an EAT arranged in the payload of the LLS packet is acquired.

However, in the reception apparatus 20, since the reception site is a region code set by the user, position information (geo-location information) represented by a reception signal received from a GPS, or the like, it is difficult to directly execute matching between the reception site and the target region tag arranged in the LLS header. Thus, the reception apparatus 20 converts the region code or the geo-location information into a target region tag by using the region mapping information recorded in the memory in the process of step S12 so as to be an ID system common to the target region tag arranged in the LLS header and then, executes matching between the converted target region tag and the target region tag arranged in the LLS header.

Here, for example, by using a service provider ID or a priority level arranged in the extension information of the LLS header, filtering for each service provider or filtering according to the priority level may be executed together.

As illustrated in FIG. 10, in the EAT acquired in the process of step S16, since an EAMessageData element among the elements of EAMessage appears, the emergency information is transmitted as an emergency information message in the form of a subtitle. Accordingly, the reception apparatus 20 displays a message content ("There is an alert for heavy rain . . . " included in the EAT illustrated in the drawing) of the EAMessage element of the EAT to overlap a displayed television program (S17 and D12). Accordingly, the user can notice that an alert for heavy rain has been issued by checking a subtitle (of the emergency information message) displayed to overlap the television program.

However, since a target detailed region code is set in the EAGeoloc element of the EAT, the reception apparatus 20 executes message filtering by executing matching whether or not the reception site is included in an EA target detailed region A3 represented by the target detailed region code of the EAT. Then, as a result of this message filtering, in a case where an emergency information message targeted for the EA target detailed region A3 including the reception site is detected, the emergency information message is displayed. In the example illustrated in FIG. 10, a case is illustrated in which the emergency information message targeted for the EA target detailed region A3 including the reception site is detected (D12).

In the EAT illustrated in FIG. 10, while only one emergency information message is described, also in a case where a plurality of emergency information messages are described, similar message filtering is executed, and, in a case where one or a plurality of emergency information messages targeted for the EA target detailed region A3 including the reception site are detected, the one or the plurality of emergency information messages are displayed. In a case where a plurality of emergency information messages are present, the user may select a desired emergency information message.

Here, the content of the subtitle that is displayed to overlap the television program represents the issuance of the alert for heavy rain but does not represent detailed information thereof. For this reason, in a case where display of detailed information is directed according to a user's operation of a remote controller or the like (S18), the detailed information of the alert for heavy rain is displayed as additional information of the emergency information (S19 to S22).

More specifically, in the EAT illustrated in FIG. 10, an EAService element among the elements of EAMessage appears, and "nrt" is designated as the serviceType attribute, and accordingly, the detailed information of the alert for heavy rain is transmitted as NRT portal information of an Non Real Time (NRT) portal service. Accordingly, by executing a channel selection process using the value of a serviceId attribute of the EAService element of the EAT and the channel selection information (SLS bootstrap information), the reception apparatus 20 acquires SLS signaling data transmitted using a ROUTE session (S19).

Then, the reception apparatus 20 acquires the NRT portal information transmitted using the ROUTE session according to the SLS signaling data (S20) and displays detailed information of the alert for heavy rain acquired therefrom (S21, S22, and D13).

As above, in the emergency information message transmission illustrated in FIG. 10, the reception apparatus 20 that is in the middle of displaying the television program executes packet filtering and, in a case where an EAT for the EA target region A2 including the reception site is detected, acquires the EAT and further executes message filtering and, in a case where an emergency information message for the EA target detailed region A3 including the reception site is detected, displays the emergency information message.

Accordingly, the reception apparatus 20 transits from a screen (D11 state) on which a television program is displayed to a screen (D12 state) on which a subtitle (emergency information message) overlaps the television program, whereby the subtitle of the emergency information is displayed on the screen. As a result, a user viewing the television program can notice that an alert for heavy rain has been issued by forcibly checking the subtitle that is displayed to overlap the television program.

In addition, the user who has checked the subtitle overlapping the television program, in a case where information relating to further detailed weather is desired to be acquired, executes a predetermined operation, whereby a screen (D13 state) of detailed information of the alert for heavy rain transmitted as the NRT portal information is displayed on the reception apparatus 20. As a result, the user can acquire deeper information relating to the alert for heavy rain by checking the detailed information including information that is not-representable in the subtitle.

In the operating example illustrated in FIG. 10, while the detailed information of the emergency information has been described to be transmitted using the ROUTE session as the NRT portable information, another transmission method through broadcast or communication may be used.

For example, the server 30 connected to the Internet 90 may provide an application (emergency information application) used for emergency information as the detailed information of the emergency information. In such a case, in a case where display of detailed information is directed by the user, the reception apparatus 20 accesses the server 30 through the Internet 90 and acquires and starts up the emergency information application, thereby presenting the detailed information of the emergency information. The emergency information application can be controlled using application control information such as an Application Information Table (AIT).

In addition, the server 30 connected to the Internet 90 may provide a web page configured by a document of an HyperText Markup Language (HTML) format or the like as the detailed information of the emergency information. In such a case, in a case where display of detailed information is directed by the user, the reception apparatus 20 accesses the server 30 through the Internet 90 and acquires and displays a web page, thereby presenting the detailed information of the emergency information. In addition, in the example illustrated in FIG. 10, instead of the emergency information message, emergency information of another form such as an emergency information application or a web page may be transmitted.

In the operating example illustrated in FIG. 10, while an example has been described in which, in a case where the reception apparatus 20 is started up and displays a television program, an EAT including the emergency information is detected, and an emergency information message is displayed, in a case where the reception apparatus 20 is in a sleep state, it may be configured such that, after the reception apparatus 20 is forcibly started up, an EAT including emergency information is detected, and an emergency information message is displayed. In such a case, by including a signal (enforced emergency startup signal) used for emergently starting up the reception apparatus 20 in a forced manner as control information of the preamble, the transmission apparatus 10 can emergently start up the reception apparatus 20 by forcibly turns on the power of the reception apparatus 20.

4. <Example of Syntax>

(Syntax of ADT)

FIG. 11 is a diagram that illustrates an example of syntax of an ADT of the Extensible Markup Language (XML) format. In FIG. 11, "@" is attached to each attribute among elements and attributes. In addition, an indented element or attribute is designated for an element of a higher rank. Such a relation is similar also in the syntax of an EAT illustrated in FIG. 12 to be described later.

As illustrated in FIG. 11, an adt element as a root element is an element of a higher rank of an area element.

Information relating to an EA target region is designated in the area element. The area element is an element of a higher rank of an areaTag attribute, a codes element, and a geo_loc element. A target region tag is designated in the areaTag attribute.

In addition, information relating to a region code is designated in the codes element. The codes element is an element of a higher rank of a type attribute and a unit element. Information (type information) representing the type of the region code is designated in the type attribute. For example, as the type attributes, "fipsc", "fipss", "zip5", or "zip9" is set.

"fipsc" and "fipss" represent a county code (C) and a state code (S) of the federal information processing standards (FIPS). In addition, "zip5" and "zip9" represent a zip code of five digits and a zip code of nine digits used by the United States Postal Service (USPS). The value of a region code is designated in the unit element.

Information relating to a geo-location is designated in the geo_loc element. The geo_loc element is an element of a higher rank of an nw_lat attribute, an nw_lon attribute, an se_lat attribute, and an se_lon attribute. The nw_lat attribute represents the latitude of a north west end. The nw_lon attribute represents the longitude of the north west end. The se_lat attribute represents the latitude of a south east end. The se_lon attribute represents the longitude of the south east end.

In FIG. 11, in a case where "1" is designated as the appearance frequency (Cardinality), only one of the element or the attribute is necessarily designated, and, in a case where "0..1" is designated, it is arbitrary whether to designate the element or the attribute or not. In addition, in a case where "1..n" is designated, one or more elements or attributes are designated, and, in a case where "0..n" is designated, it is arbitrary whether to designate one or more elements or attributes or not. Such a relation is similar also in the syntax of the EAT illustrated in FIG. 12 to be described later.

(Syntax of EAT)

FIG. 12 is a diagram that illustrates an example of the syntax of an EAT of the XML format.

As illustrated in FIG. 12, an Eat element as a root element is an element of a higher rank of an AutomaticTuningService element and an EAMessage element.

In the AutomaticTuningService element, information relating to a service (automatic channel selection service) of which the channel is selected at the time of startup in a case where the reception apparatus 20 is forcibly started up is designated. The AutomaticTuningService element is an element of a higher rank of a broadcastStreamID attribute and a serviceId attribute. In the broadcastStreamID attribute, a broadcast stream ID of the automatic channel selection service is designated. In the serviceId attribute, a service ID of the automatic channel selection service is designated.

In the EAMessage element, a message of emergency information is designated. The EAMessage element is an element of a higher rank of an eaMessageId attribute, an eaPriority attribute, an EAGeoloc element, an EAMessageData element, an EAApplication element, an EAService element, an EAWww element, and an EA_phonetic_info element.

In the eaMessageId attribute, a message ID is designated as an identifier of emergency information. In the eaPriority attribute, a priority level of the emergency information is designated.

In the EAGeoloc element, information relating to an EA target detailed region is designated. The EAGeoloc element is an element of a higher rank of a type attribute. In the type attribute, information (type information) representing a type of the EA target detailed region code is designated. As the type attribute, "adt", "fips5", "zip5", or "zip9" is set.

"adt" represents that a target region tag is set as the EA target detailed region code. For example, in a case where "adt" is set, the target region tag is used in both packet filtering and message filtering. More specifically, by applying this to the examples illustrated in FIGS. 3 and 4 described above, this corresponds to a case where, after packet filtering is executed by using a target region tag of "0x0002", and message filtering is executed using a target region tag of "0x0005". In other words, for example, Morgan County having a region code of "18109" is a region of the EA target region A22 that belongs to the EA target region A25, and such a target region tag is designated in an embedded manner, and accordingly, such emergency information filtering can be executed.

"fips5" represents a code of the federal information processing standards (FIPS) having five digits, in other words, for example, a county code (County code) configured by five digits. In addition, "zip5" and "zip9" represent a zip code of five digits and a zip code of nine digits used by the United States Postal Service (USPS).

The value of the EA target detailed region code corresponding to such type information is designated as the value of the EAGeoloc element. While the EAGeoloc element may not be designated, however, in such a case, in the message filtering, filtering of type information corresponding to packet filtering is executed. For example, in a case where packet filtering using the target region tag is executed, filtering using the target region tag is executed also in the message filtering. By designating a plurality of EAGeoloc elements, logical operations such as logical AND and logical OR according to the plurality of EA target detailed region codes is applied, and a more complex filtering condition can be set.

In a case where the emergency information is transmitted as a subtitle, the subtitle information (emergency information message) is designated in the EAMessageData element.

In a case where the emergency information is transmitted as an emergency information application, information relating to the emergency information application is designated in the EAApplication element. The EAApplication element is an element of a higher rank of an applicationId attribute. In the applicationId attribute, an application ID of the emergency information application is designated. In addition, this application ID is associated with an identifier of an application managed in the application control information of an AIT or the like.

In a case where the emergency information is transmitted as an emergency information service, information relating to the emergency information service is designated in the EAService element. The EAService element is an element of a higher rank of a serviceId attribute and a serviceType attribute. A service ID of the emergency information service is designated in the serviceId attribute. In the serviceType attribute, service type information is designated. As this service type information, "nrt", "tv", or "audio" is designated.

"nrt" represents that the emergency information is transmitted as NRT portal information of the NRT portal service. "tv" represents a transition to a dedicated channel (service) providing the emergency information. "audio" represents that the emergency information is provided using audio data. In such a case, a video of the television program that is in the middle of viewing is maintained to be the same, and only the audio is replaced by an audio of the emergency information.

In a case where the emergency information is provided by an emergency information site on the Internet 90, information relating to the emergency information site is designated in the EAWww element. The EAWww element is an element of a higher rank of a url attribute. The URL (Uniform Resource Locator) of the emergency information site is designated in the url attribute. For example, as this URL, the URL of the server 30 that provides the emergency information site may be designated.

In the EA_phonetic_info element, information relating to voice reading that is dedicatedly used for a visually impaired person is designated. The EA_phonetic_info element is an element of a higher rank of a format attribute and a url attribute. In the format attribute, the format of text information that can be read using a voice reading engine is designated. For example, as this format, "ssml" is designated. "ssml" represents an SSML (Speech Synthesis Markup Language) that is a speech synthesis markup language.

In addition, in the url attribute, the URL of an acquisition destination of text information used for voice reading is designated. For example, as this URL, the URL of the server 30 that provides text information used for voice reading may be designated. In addition, the text information used for the voice reading may be designated as a value of the EA phonetic info element instead of being acquired from the server 30 on the Internet 90.

Furthermore, the syntaxes of the ADT illustrated in FIG. 11 and the EAT illustrated in FIG. 12 are examples, and other syntaxes may be employed. In addition, the ADT and the EAT are not limited to the XML format but may be described using other markup languages or may be in a section format.

5. <Configuration of Each Apparatus>

Next, detailed configurations of the transmission apparatus 10 and the reception apparatus 20 configuring the transmission system 1 illustrated in FIG. 1 will be described. Here, while a detailed configuration of the server 30 will not be described, the server 30 has a function of a general server.

(Configuration of Transmission Apparatus)

FIG. 13 is a diagram that illustrates an example of the configuration of the transmission apparatus 10 illustrated in FIG. 1.

As illustrated in FIG. 13, the transmission apparatus 10 is configured by: a component acquiring unit 111; an encoder 112; a signaling generating unit 113; a signaling processing unit 114; a region mapping information generating unit 115; an emergency information generating unit 116; a multiplexer 117; and a transmission unit 118.

The component acquiring unit 111 acquires data of a video, an audio, a subtitle, and the like (components thereof) configuring a content (for example, a television program) provided by a specific service and supplies the acquired data to the encoder 112. The encoder 112 codes the data of a video, an audio, and the like (components thereof) supplied from the component acquiring unit 111 according to a predetermined coding system and supplies the coded data to the multiplexer 117.

In addition, the component acquiring unit 111, for example, acquires a content corresponding to a broadcast time frame from a storage place of contents that have already been recorded therein or acquires a live content from a studio or a location place.

The signaling generating unit 113 acquires original data used for generating signaling data from an external server, a built-in storage, or the like. The signaling generating unit 113 generates signaling data by using the original data of the signaling data and supplies the generated signaling data to the signaling processing unit 114. The signaling processing unit 114 processes the signaling data supplied from the signaling generating unit 113 and supplies the processed signaling data to the multiplexer 117.

Here, LLS signaling data configured by LLS metadata of a FIT or the like and SLS signaling data configured by SLS metadata of a USD, an MPD, or the like are generated and processed.

The region mapping information generating unit 115 acquires original data used for generating the region mapping information from an external server, a built-in storage, or the like. The region mapping information generating unit 115 generates region mapping information by using the original data of the region mapping information and supplies the generated region mapping information to the signaling processing unit 114. The signaling processing unit 114 generates an ADT including the region mapping information by synthesizing the ADT supplied from the signaling generating unit 113 and the region mapping information supplied from the region mapping information generating unit 115 and supplies the generated ADT to the multiplexer 117.

The region mapping information may be included in other LLS metadata of, for example, an FIT, an EAT, or the like instead of being included in the ADT. However, in a case where the region mapping information is included in the FIT, the region mapping information, for example, may be described as an independent element of the FIT. On the other hand, in a case where the region mapping information is included in the EAT, it is not necessary to update the region mapping information so long as the content thereof is not changed, and accordingly, it is not necessary to configure the region mapping information to be included in all the EATs.

The emergency information generating unit 116 acquires original data of the emergency information such as Common Alerting Protocol (CAP) information from an external server or the like. The emergency information generating unit 116 generates emergency information by using the original data of the emergency information such as the CAP information or the like and supplies the generated emergency information to the signaling processing unit 114. The signaling processing unit 114 generates an EAT including the emergency information by synthesizing the EAT supplied from the signaling generating unit 113 and the emergency information supplied from the emergency information generating unit 116 and supplies the generated EAT to the multiplexer 117.

The CAP information is an emergency information message described in the format of an XML form that is used in an emergency notification system called Emergency Alerting System (EAS) maintained in the United States. By using such CAP information, emergency information of various levels from a top priority item from the president to a local notification item can be notified through various media. Here, the CAP information is an example of the emergency information message, and, for example, an emergency alerting message that is acquired from another organization, a service provider, or the like such as information relating to a weather alert provided by an organization announcing a weather alert may be used.

The multiplexer 117 generates a BBP stream by multiplexing the data of components supplied from the encoder 112 and the signaling data supplied from the signaling processing unit 114 and supplies the generated BBP stream to the transmission unit 118. The transmission unit 118 transmits the BBP stream supplied from the multiplexer 117 through an antenna 131 as a broadcast wave (digital broadcast signal) of digital broadcasting using the IP transmission system.

(Configuration of Reception Apparatus)

FIG. 14 is a diagram that illustrates an example of the configuration of the reception apparatus 20 illustrated in FIG. 1.

As illustrated in FIG. 14, the reception apparatus 20 is configured by: a tuner 211; a demultiplexer 212; a signaling processing unit 213; a control unit 214; an input unit 215; a memory 216; a decoder 217; a display unit 218; a speaker 219; an emergency information processing unit 220; and a communication unit 221.

The tuner 211 extracts a digital broadcast signal according to a user's service channel selection operation from a broadcast wave (digital broadcast signal) of digital broadcasting using the IP transmission system received through the antenna 231, demodulates the extracted digital broadcast signal, and supplies a BBP stream acquired as a result thereof to the demultiplexer 212.

The demultiplexer 212 divides the BBP stream supplied from the tuner 211 into the data of a video, an audio, a subtitle, and the like as components and the signaling data. The demultiplexer 212 supplies the data of the video, the audio, and the like to the decoder 217 and supplies the signaling data to the signaling processing unit 213.

In addition, in a case where an EAT including emergency information is extracted from the BBP stream, the demultiplexer 212 supplies the EAT to the emergency information processing unit 220.

The signaling processing unit 213 processes the signaling data supplied from the demultiplexer 212 and supplies the processed signaling data to the control unit 214. Here, LLS metadata of an FIT or the like as the LLS signaling data and SLS metadata of an USD, an MPD, or the like as the SLS signaling data are acquired and processed.

The control unit 214 controls the operation of each unit of the reception apparatus 20. The control unit 214 controls the operation of each unit such that a stream of components delivered through broadcasting or communication is acquired and reproduced based on the signaling data supplied from the signaling processing unit 213.

The input unit 215 supplies an operation signal according to a user's operation to the control unit 214. The control unit 214 controls the operation of each unit based on the operation signal supplied from the input unit 215. The memory 216 is a nonvolatile memory such as an NVRAM and records various kinds of data under the control of the control unit 214.

The decoder 217 decodes data of a video, an audio, and the like (components thereof) supplied from the demultiplexer 212 in accordance with a predetermined decoding system and respectively supplies video data and audio data to the display unit 218 and the speaker 219. The display unit 218 displays a video corresponding to the video data supplied from the decoder 217. The speaker 219 outputs an audio corresponding to the audio data supplied from the decoder 217.

The emergency information processing unit 220 processes an EAT including the emergency information that is supplied from the demultiplexer 212 and supplies a subtitle or detailed information of the emergency information to the display unit 218 based on a result of the process. The display unit 218 displays the subtitle or the detailed information of the emergency information supplied from the emergency information processing unit 220. In addition, the emergency information processing unit 220 supplies audio data of the emergency information to the speaker 219. The speaker 219 outputs an audio corresponding to the audio data of the emergency information that is supplied from the emergency information processing unit 220.

The communication unit 221 accesses the server 30 through the Internet 90 under the control of the control unit 214 and may require the detailed information of the emergency information. The communication unit 221 receives the detailed information of the emergency information that is delivered from the server 30 through the Internet 90 and supplies the received detailed information to the emergency information processing unit 220. The emergency information processing unit 220 supplies the detailed information of the emergency information delivered through communication to the display unit 218 so as to be displayed thereon.

In addition, the communication unit 221 accesses the server 30 through the Internet 90 and requests the delivery of a stream of components such as a video, an audio, and the like under the control of the control unit 214. The communication unit 221 receives a stream of components delivered in a streaming manner from the server 30 through the Internet 90 and supplies the received stream to the decoder 217. In addition, the communication unit 221 accesses the server 30 through the Internet 90, receives signaling data (for example, SLS metadata), and supplies the received signaling data to the control unit 214 under the control of the control unit 214.

In FIG. 14, in a case where the reception apparatus 20 is a television receiver, a mobile receiver, or the like, while a configuration including the display unit 218 and the speaker 219 is illustrated, for example, in a case where the reception apparatus 20 is a set-top box, a recorder, or the like, the display unit 218 and the speaker 219 may be configured to be externally disposed. In addition, the reception apparatus 20 may be configured not to have a communication function of the communication unit 221 or the like.

While not illustrated in the configuration illustrated in FIG. 14, in a case where the reception apparatus 20 is a mobile receiver, a function for acquiring reception site information such as a function for receiving a reception signal received from a positioning satellite, for example, a GPS or the like is arranged.

6. <Flow of Process Executed by Each Apparatus>

Next, the flow of the process executed by each apparatus configuring the transmission system 1 illustrated in FIG. 1 will be described with reference to flowcharts illustrated in FIGS. 15 to 18.

(Transmission Process)

Figure 15:
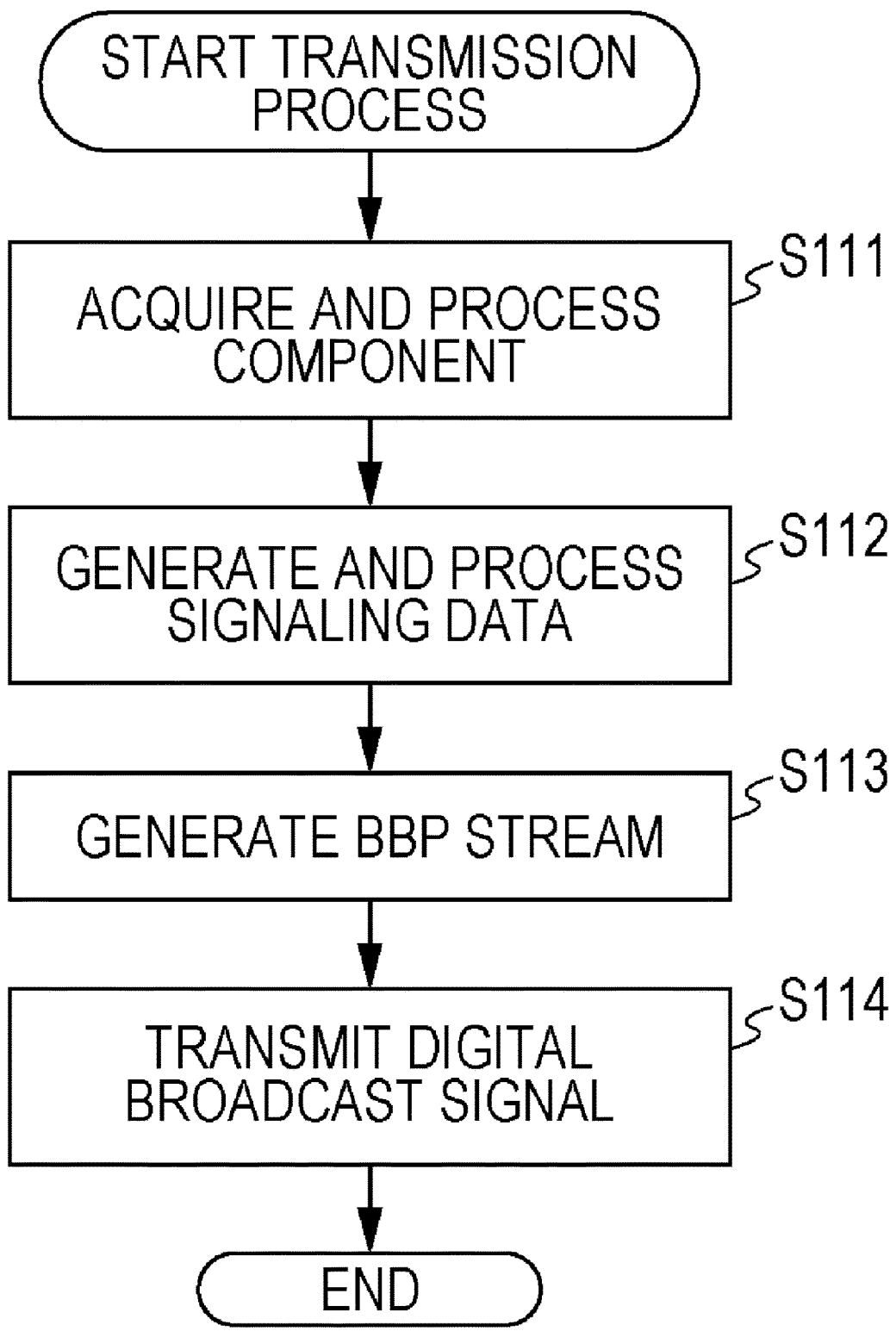
FIG. 15 is a flowchart that illustrates a transmission process.

First, the transmission process executed by the transmission apparatus 10 illustrated in FIG. 1 will be described with reference to a flowchart illustrated in FIG. 15.

In step S111, the component acquiring unit 111 acquires data of a video, an audio, and the like (components thereof). In addition, in step S111, the encoder 112 codes the data of the video, the audio, and the like (components thereof) acquired by the component acquiring unit 111.

In step S112, the signaling generating unit 113 generates signaling data by using original data of the signaling data. In addition, in step S112, the signaling processing unit 114 processes the signaling data generated by the signaling generating unit 113.

In step S113, the multiplexer 117 generates a BBP stream by multiplexing the data of the components coded in the process of step S111 and the signaling data processed in the process of step S112.

In step S114, the transmission unit 118 transmits the BBP stream generated in the process of step S113 through the antenna 131 as a broadcast wave (digital broadcast signal) of digital broadcasting using the IP transmission system. When the process of step S114 ends, the transmission process illustrated in FIG. 15 ends.

As above, the transmission process has been described.

(Emergency Information Transmission Process)

Figure 16:
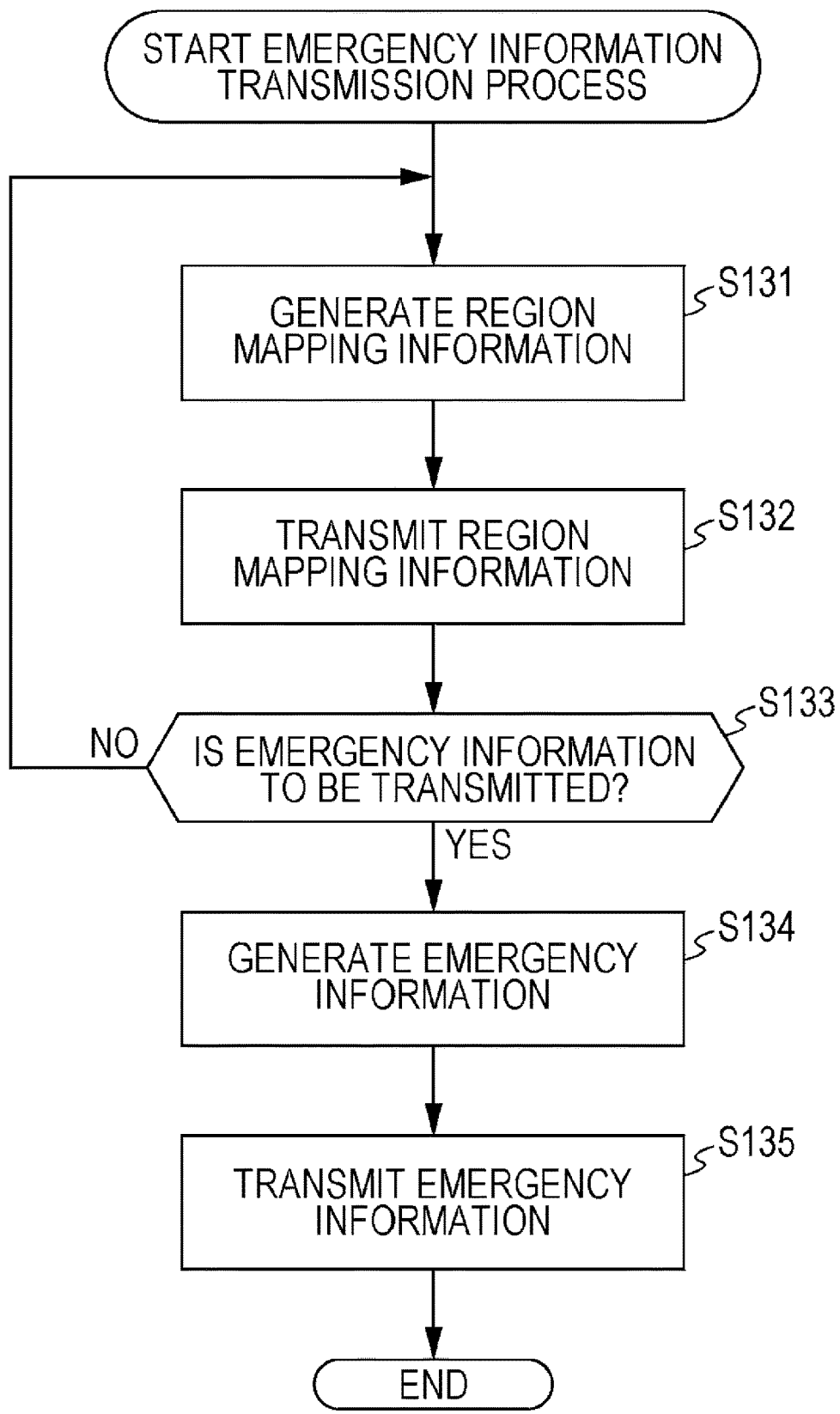
FIG. 16 is a flowchart that illustrates an emergency information transmission process.

Next, an emergency information transmission process executed by the transmission apparatus 10 illustrated in FIG. 1 will be described with reference to a flowchart illustrated in FIG. 16.

In step S131, the region mapping information generating unit 115 generates region mapping information by using original data of the region mapping information. The region mapping information generated by the region mapping information generating unit 115 is included in an ADT and is multiplexed with the data of the components and the like. The region mapping information may be included in other LLS metadata of, for example, an FIT, an EAT, or the like instead of being included in the ADT.

In step S132, the transmission unit 118 transmits the BBP stream including the ADT (region mapping information) through the antenna 131 as a broadcast wave (digital broadcast signal) of digital broadcasting using the IP transmission system.

In step S133, it is determined whether or not the emergency information is transmitted. In step S133, in a case where the emergency information is determined not to be transmitted, the process is returned to step S131, and the process of steps 5131 to S133 is repeated. On the other hand, for example, in a case where CAP information is provided from an external server or the like, and the emergency information is determined to be transmitted, the process proceeds to step S133.

In step S134, the emergency information generating unit 116 generates emergency information based on the original data of the emergency information such as the CAP information acquired from an external server or the like. The emergency information generated by the emergency information generating unit 116 is included in the EAT and is multiplexed with the data of the components and the like.

In step S135, the transmission unit 118 transmits the BBP stream including the EAT (emergency information) through the antenna 131 as a broadcast wave (digital broadcast signal) of the digital broadcasting using the IP transmission system. When the process of step S135 ends, the emergency information transmission process illustrated in FIG. 16 ends.

As above, the emergency information transmission process has been described. In this emergency information transmission process, the region mapping information is transmitted prior to the emergency information, and the emergency information is transmitted in the case of emergency. Accordingly, in the case of emergency, the reception apparatus 20 executes filtering in units of regions by using the region mapping information acquired in advance, and thus, only emergency information that is appropriate for the reception site among the emergency information notified to each region is acquired. As a result, useful information can be presented (notified) to the user using the reception apparatus 20.

(Reception Process)

Figure 17:
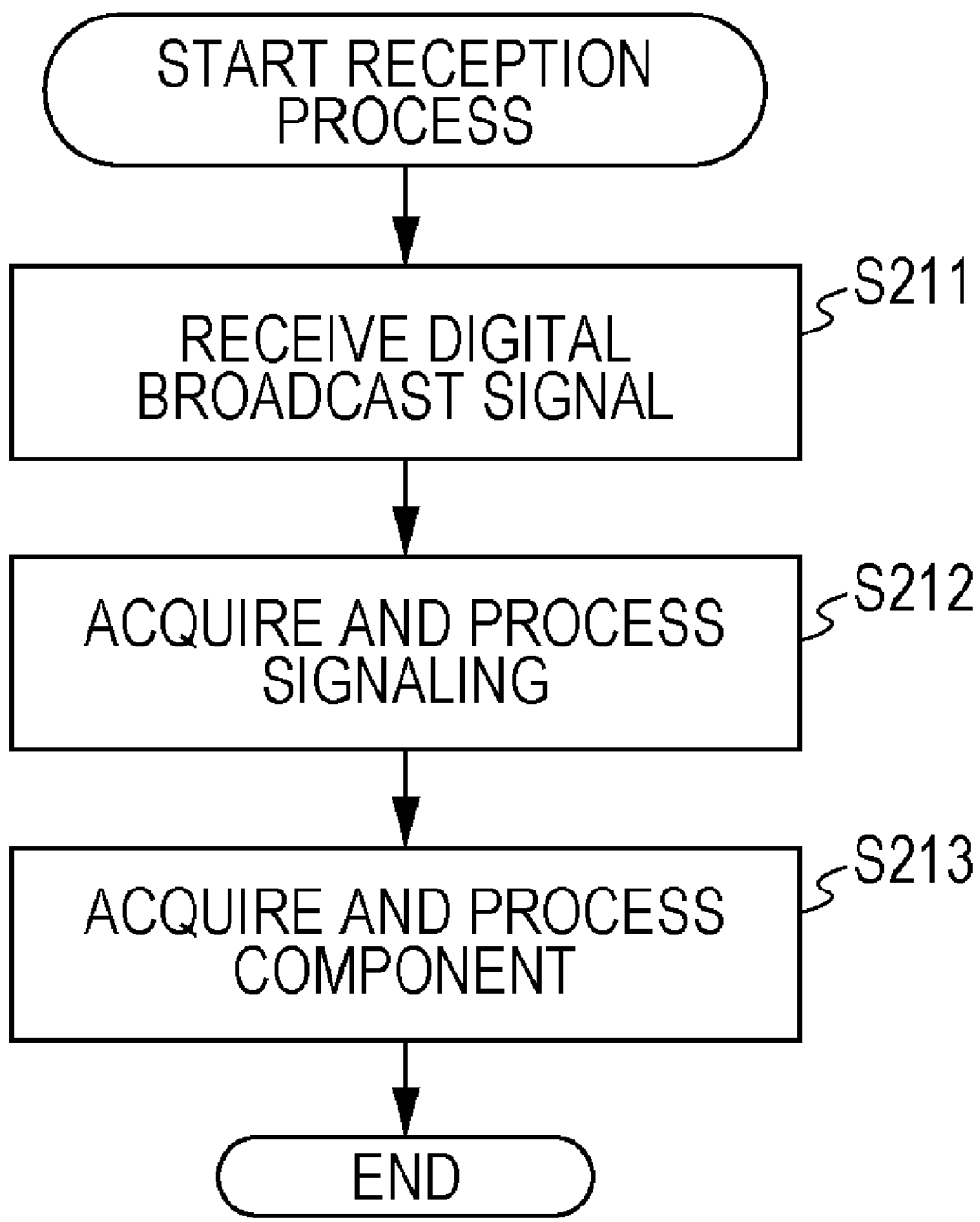
FIG. 17 is a flowchart that illustrates a reception process.

Next, a reception process executed by the reception apparatus 20 illustrated in FIG. 1 will be described with reference to a flowchart illustrated in FIG. 17. The reception process illustrated in FIG. 17, for example, is executed in a case where a desired service is selected for example, by user's operation. In addition, in the memory 216, the channel selection information acquired from the FIT through an initial scanning process or the like is assumed to be recorded.

In step S211, the tuner 211 receives a broadcast wave (digital broadcasting signal) of digital broadcasting using the IP transmission system received through the antenna 231. The BBP stream acquired by the demodulation process executed by the tuner 211 is divided into data of a video, an audio, a subtitle, and the like as components and the signaling data.

In step S212, the signaling processing unit 213 acquires and processes SLS signaling data corresponding to a service of which the channel is selected.

In step S213, the control unit 214 executes control of the demultiplexer 212, the decoder 217, and the like based on the SLS signaling data processed in the process of step S212 such that a stream of the components of the video, the audio, and the like delivered through broadcasting or through communication is acquired and reproduced. When the process of step S213 ends, the reception process illustrated in FIG. 17 ends.

As above, the reception process has been described.

(Emergency Information Responding Process)

Figure 18:
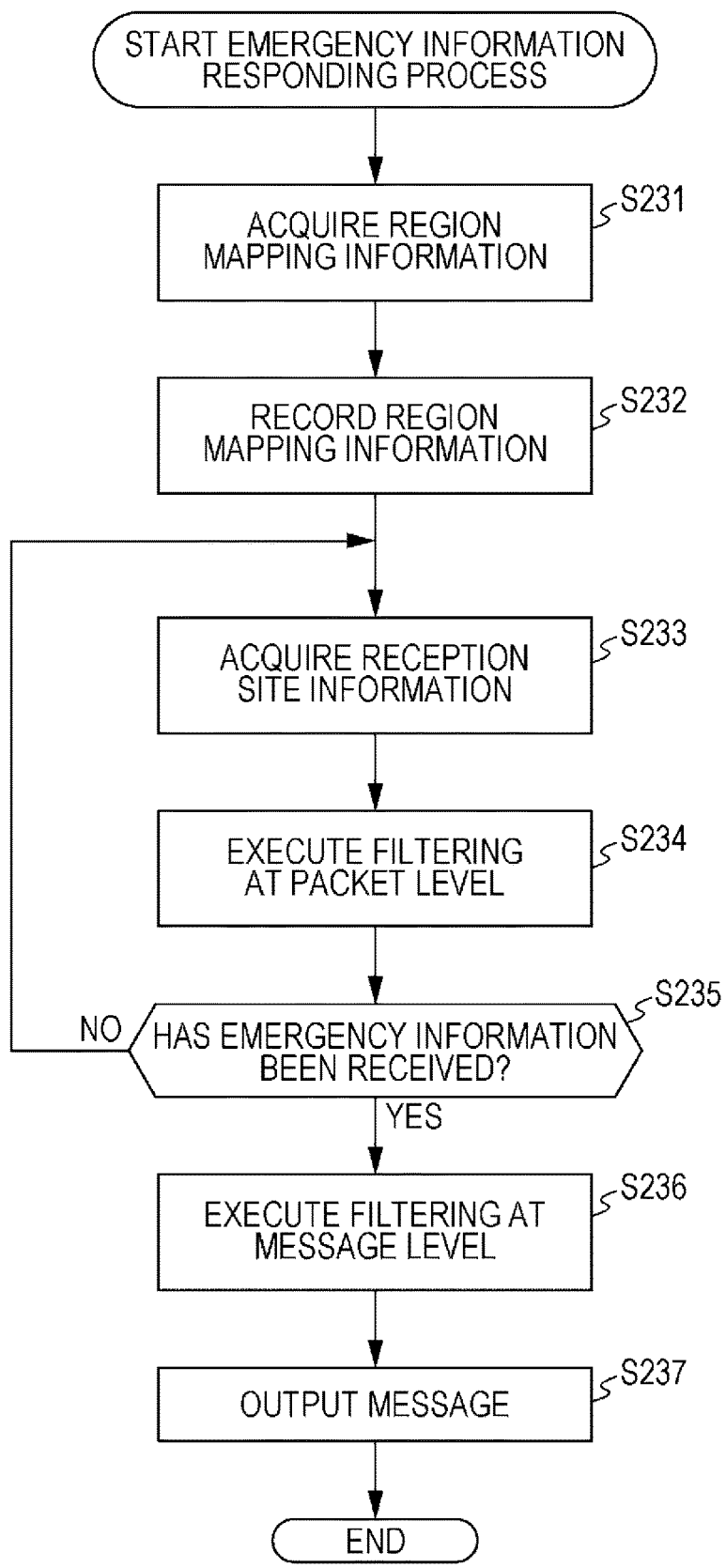
FIG. 18 is a flowchart that illustrates an emergency information responding process.

Finally, an emergency information responding process executed by the reception apparatus 20 illustrated in FIG. 1 will be described with reference to a flowchart illustrated in FIG. 18.

In step S231, the signaling processing unit 213 acquires the region mapping information separated by the demultiplexer 212. The region mapping information is included in an ADT, an FIT, or an EAT.

In step S232, the control unit 214 records the region mapping information acquired in the process of step S231 in the memory 216.

The process of acquiring and recording the region mapping information that is executed in steps S231 to S232 is executed, for example, in the initial scanning process in a case where the reception apparatus 20 is a television receiver. On the other hand, for example, in a case where the reception apparatus 20 is a mobile receiver such as a smartphone, a region mapping information acquiring process is executed for every predetermined interval at the time of movement.

In step S233, the control unit 214 acquires reception site information. As this reception site information, for example, in a case where the reception apparatus 20 is a fixed receiver such as a television receiver, a region code or the like set by the user at the time of initial scanning or the like may be used. On the other hand, for example, in a case where the reception apparatus 20 is a mobile receiver such as a smartphone, position information (geo-location information) represented by a reception signal received from a positioning satellite such as a GPS or the like may be used.

In step S234, the demultiplexer 212 executes filtering (packet filtering) at the packet level under the control of the control unit 214.

In this packet filtering, the LLS header of the LLS packet is monitored, and it is monitored whether or not the type information (Type) represents the EAT, and a reception site represented by the reception site information acquired in the process of step S233 is included in an EA target region A2 represented by the target region tag arranged in the extension information (Type extension).

However, in the reception apparatus 20, since the reception site represented by the reception site information acquired in the process of step S233 is a region code set by the user, position information (geo-location information) represented by a reception signal received from a GPS, or the like, it is difficult to directly execute matching between the reception site and the target region tag arranged in the LLS header. Thus, the reception apparatus 20 reads the region mapping information recorded in the memory 216 in the process of step S232 and converts the region code or the geo-location information into a target region tag so as to be an ID system common to the target region tag arranged in the LLS header and then, executes matching between the converted target region tag and the target region tag arranged in the LLS header.

In step S235, as a result of the packet filtering executed in step S234, it is determined whether or not an EAT including the emergency information has been received. In step S235, in a case where an EAT including the emergency information is determined not to have been received, the process is returned to step S233, and the process of steps S233 to S235 is repeated. However, in step S233, in a case where the content of the reception site represented by the reception site information is not changed, the process of step S233 may be skipped. Here, in the case of a fixed receiver, the reception site does not change. On the other hand, in the case of a mobile receiver, there is a possibility that the reception site changes.

On the other hand, in step S235, in a case where an EAT including the emergency information is determined to have been received, the process proceeds to step S236.

In step S236, the emergency information processing unit 220 executes filtering (message filtering) at the message level under the control of the control unit 214.

In this message filtering, matching is executed so as to determine whether or not the reception site represented by the reception site information acquired in the process of step S233 is included in the EA target detailed region A3 represented by the target detailed region code of the EAT.

In step S237, as a result of the message filtering executed in step S236, in a case where an emergency information message targeted for the EA target detailed region A3 including the reception site represented by the reception site information acquired in the process of step S233 is detected, the emergency information processing unit 220 displays the emergency information message. When the process of step S237 ends, the emergency information responding process illustrated in FIG. 18 ends.

As above, the emergency information responding process has been described. In this emergency information responding process, the region mapping information transmitted from the transmission apparatus 10 is acquired and recorded prior to the emergency information, and, in the case of emergency, filtering (packet filtering and message filtering) is executed in units of regions by using the region mapping information that has been recorded. Accordingly, the reception apparatus 20 executes filtering in units of regions, and only emergency information that is appropriate for the reception site among the emergency information notified to each region is acquired, and accordingly, useful information can be presented (notified) to the user.

In the description presented above, while a case has been described in which both the packet filtering and the message filtering are executed as filtering in units of regions, the reception apparatus 20 may execute at least one of the packet filtering and the message filtering.

7. <Modified Example>

In the description presented above, as the standard of the terrestrial digital television broadcasting, while the ATSC employed by the United States and the like has been described, the present technology may be applied to an Integrated Services Digital Broadcasting (ISDB) that is a system employed by Japan and the like, a Digital Video Broadcasting (DVB) that is a system employed by each European country, or the like. In addition, the present technology is not limited to the terrestrial digital television broadcasting but may be employed in satellite digital television broadcasting, digital wired television broadcasting, or the like. Furthermore, in the description presented above, while a case has been described in which the IP transmission system such as ATSC 3.0 is employed, the present technology may be applied to an MPEG2-TS system.

In the description presented above, as the name of the signaling data, while "T" that is an abbreviation of "Table" is mainly used, there are cases where "D" that is an abbreviation of "Description" is used. For example, the Emergency Alerting Table (EAT) may be described as an Emergency Alerting Description (EAD). However, such a difference in the name is a difference in the forms of "Table" and "Description", and there is no difference in the substantial contents of the signaling data (metadata).

In the description presented above, while the elements and the attributes have been described in a case where the signaling data is described by a markup language such as an XML, the names of the elements and the attributes are examples, and other names may be used. For example, there are cases where a broadcast stream ID (Broadcast Stream ID) defined in an FIT, an EAT, or the like is referred to as a network ID (Network ID), an RF allocation ID (RF Alloc ID), an RF channel ID (RF Channel ID), or the like. However, such a difference in the names is a difference in the forms, and there is no difference in the substantial contents of such elements or attributes. In addition, the LLS metadata and the SLS metadata described above are examples, and any other metadata may be configured to be included.

In the transmission system 1 illustrated in FIG. 1, while a configuration in which a broadcast wave of digital broadcasting transmitted from the transmission apparatus 10 is directly received by the reception apparatus 20 is illustrated, the broadcast wave of the digital broadcasting may be transmitted through one or a plurality of relay stations (not illustrated in the drawing). In addition, in the transmission system 1 illustrated in FIG. 1, in a case where the reception apparatus 20 is a mobile receiver, the reception apparatus 20 is connected to the Internet 90 through an access point of a public wireless LAN (Local Area Network) or is connected to the server 30 through a mobile network (not illustrated in the drawing) such as Long Term Evolution (LTE) or LTE-Advanced.

In the transmission system 1 illustrated in FIG. 1, there is a case where the reception apparatus 20 does not have a communication function or a case where the reception apparatus 20 has a communication function that is invalidated. In such a case, it is difficult for the reception apparatus 20 to access the server 30. In FIG. 1, for the simplification of description, while the server 30 is illustrated to deliver all the data of a stream of components such as a video, an audio, and the like, the signaling data, and data of an application, a web page, and the like, the data of the stream of the components and the signaling data and the data of the application and the like may be delivered from mutually-different servers.

In the description presented above, while a case where the geo-location information is acquired as position information represented by the reception signal received from a positioning satellite such as a GPS has been described, for example, any other method capable of specifying the user's current position such as a method of acquiring a place that can be specified based on information of a connection to an access point of a public wireless LAN or a method of acquiring user's position information through a search of a database using an IP address may be employed.

While the ADT illustrated in FIG. 11 has been described as an independent table configuring the LLS signaling data, as described above, the region mapping information included in the ADT may be included as an element of any other table such as an FIT or an EAT. For example, in the EAT illustrated in FIG. 12, as an element of the same level as that of the AutomaticTuningService element, after the adt element of the ADT illustrated in FIG. 11 is included as an optional element, and then, the target region tag (Area_tag) of the extension information (Type extension) illustrated in FIG. 9 in the LLS index information (Signaling Index) is set to "0×00" for an EAT transmitting only the adt element, and the EAT is transmitted. Accordingly, an operating form can be employed in which the reception apparatus 20, first, acquires an EAT designated as the target region tag (Area_tag) ="0×00" and, next, acquires an EAT including the emergency information message (EAMessage) in which a specific target region tag (region code) is set in the target region tag (Area_tag).

8. <Configuration of Computer>

A series of the processes described above can be performed either by hardware or by software. In a case where the series of the processes is performed by software, a program configuring the software is installed to a computer. FIG. 19 is a diagram that illustrates an example of the hardware configuration of a computer that executes the series of processes described above by using a program.

In the computer 900, a CPU (Central Processing Unit) 901, a Read Only Memory (ROM) 902, and a Random Access Memory (RAM) 903 are interconnected through a bus 904. In addition, an input/output interface 905 is connected to the bus 904. An input unit 906, an output unit 907, a recording unit 908, a communication unit 909, and a drive 910 are connected to the input/output interface 905.

The input unit 906 is configured by a keyboard, a mouse, a microphone, and the like. The output unit 907 is configured by a display, a speaker, and the like. The recording unit 908 is configured by a hard disk, a non-volatile memory, and the like. The communication unit 909 is configured by a network interface and the like. The drive 910 drives a magnetic disk, an optical disc, a magneto-optical disk, or a removable medium 911 such as a semiconductor memory.

In the computer 900 configured as above, the CPU 901, for example, loads a program recorded in the ROM 902 or the recording unit 908 into the RAM 903 through the input/output interface 905 and the bus 904 and executes the loaded program, thereby executing the series of the processes described above.

The program executed by the computer 900 (the CPU 901), for example, may be provided with being recorded on a removable medium 911 as a package medium or the like. In addition, the program may be provided through a wired or wireless transmission medium such as a local area network, the Internet, or digital satellite broadcast.

In the computer 900, by loading the removable medium 911 into the drive 910, the program can be installed to the recording unit 908 through the input/output interface 905. In addition, the program may be received by the communication unit 909 through a wired or wireless transmission medium and be installed to the recording unit 908. Furthermore, the program may be installed to the ROM 902 or the recording unit 908 in advance.

Here, in this specification, the process executed by the computer based on a program does not necessarily executed according to the sequence described in the flowchart. In other words, the processes executed by the computer based on a program include processes executed in parallel with each other or processes that are individually executed (for example, a parallel process or a process using an object). In addition, the program may be processed by one computer (processor) or may be processed by a plurality of computers in a distributed manner.

In addition, the present technology is not limited to the embodiments described above, and various changes can be made therein in a range not departing from the concept of the present technology.

The present technology may take configurations as below.

(1)

A reception apparatus including:

circuitry configured to receive region mapping information that includes at least one target region identifier and, for each of the at least one target region identifier, location information associated with the respective target region identifier; and control filtering such that emergency information for a location associated with the reception apparatus is acquired based on the region mapping information.

(2)

The reception apparatus according to (1), wherein the region mapping information is associated with one or more regions.

(3)

The reception apparatus according to (1) or (2), wherein the circuitry is configured to convert the location associated with the reception apparatus to one of the at least one target region identifier based on the region mapping information.

(4)

The reception apparatus according to any of (1) to (3), wherein each of the at least one target region identifier is a target region tag used for identifying a region to which the emergency information is targetable, and the location information for each of the at least one target region tag includes at least one of a region code assigned to a predetermined region disposed inside an area represented by the respective target region tag or position information representing a predetermined position corresponding to the area represented by the respective target region tag.

(5)

The reception apparatus according to any of (1) to (4), wherein the circuitry is configured to filter a packet including the emergency information in units of target regions.

(6)

The reception apparatus according to any of (1) to (5), wherein the circuitry is configured to filter one or a plurality of messages included in the emergency information in the units of the target regions.

(7)

The reception apparatus according to (6), wherein the circuitry is configured to filter the plurality of messages based on a service provider associated with at least one of the plurality of messages.

(8)

The reception apparatus according to (6) or (7), wherein the circuitry is configured to filter the plurality of messages based on a priority level of at least one of the plurality of messages.

(9)

The reception apparatus according to any of (1) to (8), wherein the location associated with the reception apparatus is a region set by a user or a position indicated by a reception signal received from a positioning satellite.

(10)

The reception apparatus according to any of (1) to (9), further including:

a receiver configured to receive a digital broadcast signal that is transmitted using an IP (Internet Protocol) transmission system.

(11)

The reception apparatus according to (10), wherein the IP transmission system is compliant with ATSC (Advanced Television Systems Committee) 3.0, and the emergency information and the region mapping information are transmitted in a layer lower than an IP layer in a protocol stack of the IP transmission system.

(12)

A method of a reception apparatus for acquiring emergency information, the method including:

receiving, by circuitry of the reception apparatus, region mapping information that includes at least one target region identifier and, for each of the at least one target region identifier, location information associated with the respective target region identifier; and controlling, by the circuitry, filtering such that the emergency information for a location associated with the reception apparatus is acquired based on the region mapping information.

(13)

A transmission apparatus including:

circuitry configured to generate region mapping information that includes at least one target region identifier and, for each of the at least one target region identifier, location information associated with the respective target region identifier;

receive content;

transmit the content and the region mapping information; and transmit the emergency information when an emergency in a region represented by one of the at least one target region identifier occurs.

(14)

The transmission apparatus according to claim (13), wherein the region mapping information is associated with one or more regions.

(15)

The transmission apparatus according to (13) or (14), wherein the region mapping information is used to convert a location associated with a reception apparatus that receives the content and the region mapping information to one of the at least one target region identifier.

(16)

The transmission apparatus according to any of (13) to (15), wherein each of the at least one target region identifier is a target region tag used for identifying a region to which the emergency information is targetable, and the location information for each of the at least one target region tag includes at least one of a region code assigned to a predetermined region disposed inside an area represented by the respective target region tag or position information representing a predetermined position corresponding to the area represented by the respective target region tag.

(17)

The transmission apparatus according to any of (13) to (16), wherein the region mapping information is used to filter a packet including the emergency information in units of target regions.

(18)

The transmission apparatus according to any of (13) to (17), wherein the region mapping information is used to filter one or a plurality of messages included in the emergency information in the units of the target regions.

(19)

The transmission apparatus according to (18), wherein the plurality of messages is filtered based on a service provider associated with at least one of the plurality of messages.

(20)

The transmission apparatus according to (18) or (19), wherein the plurality of messages is filtered based on a priority level of at least one of the plurality of messages.

(21)

The transmission apparatus according to any of (13) to (20), wherein the location associated with the reception apparatus is a region set by a user or a position indicated by a reception signal received from a positioning satellite.

(22)

The transmission apparatus according to any of (13) to (21), wherein the circuitry is configured to transmit a digital broadcast signal using an IP (Internet Protocol) transmission system.

(23)

The transmission apparatus according to (22),wherein the IP transmission system is compliant with ATSC 3.0, and the emergency information and the region mapping information are transmitted in a layer lower than an IP layer in a protocol stack of the IP transmission system.

(24)

A method of a transmission apparatus for transmitting emergency information, the method including:

generating, by circuitry of the transmission apparatus, region mapping information that includes at least one target region identifier and, for each of the at least one target region identifier, location information associated with the respective target region identifier;

receiving content;

transmitting, by the circuitry, the content and the region mapping information; and transmitting, by the circuitry, the emergency information when an emergency in a region represented by one of the at least one target region identifier occurs.

(25)

A reception apparatus including:

a reception unit that receives a broadcast wave of digital broadcasting using an Internet Protocol (IP) transmission system;

an acquisition unit that acquires region mapping information associating emergency information notified to each region by using the broadcast wave and information relating to a region; and a control unit that controls filtering such that emergency information appropriate for a reception position of the broadcast wave among the emergency information notified to each region is acquired based on the region mapping information.

(26)

The reception apparatus according to (25), wherein the region mapping information is information used for converting the reception position of the broadcast wave into a format appropriate for filtering in units of regions.

(27)

The reception apparatus according to (26), wherein the region mapping information associates a target region tag used for identifying a region to which the emergency information is notified and at least one of a region code assigned to each predetermined region disposed inside an area represented by the target region tag and position information representing a predetermined position corresponding to the area represented by the target region tag.

(28)

The reception apparatus according to any of (25) to (27), wherein the control unit filters a packet storing the emergency information in units of regions.

(29)

The reception apparatus according to any of (25) to (28), wherein the control unit filters one or a plurality of messages included in the emergency information in units of regions.

(30)

The reception apparatus according to (29), wherein the control unit filters the messages for each service provider providing a service.

(31)

The reception apparatus according to (29), wherein the control unit filters the messages based on priority levels of the messages.

(32)

The reception apparatus according to any of (25) to (31), wherein the reception position of the broadcast wave is information relating to a region set by a user or position information represented by a reception signal received from a positioning satellite.

(33)

The reception apparatus according to any of (25) to (32), wherein the IP transmission system is compliant with ATSC (Advanced Television Systems Committee) 3.0, and wherein the emergency information and the region mapping information are transmitted in a layer lower than an IP layer in a protocol stack of the IP transmission system.

(34)

A reception method for a reception apparatus, the reception method using the reception apparatus including:

receiving a broadcast wave of digital broadcasting using an IP transmission system;

acquiring region mapping information associating emergency information notified to each region by using the broadcast wave and information relating to a region; and controlling filtering such that emergency information appropriate for a reception position of the broadcast wave among the emergency information notified to each region is acquired based on the region mapping information.

(35)

A transmission apparatus including:

a generation unit that generates region mapping information associating emergency information notified to each region by using a broadcast wave of an IP transmission system and information relating to a region;

an acquisition unit that acquires a content; and a transmission unit that transmits the content and the region mapping information using the broadcast wave and transmits the emergency information in the case of emergency.

(36)

The transmission apparatus according to (35), wherein the region mapping information is information used for converting a reception position of the broadcast wave in a reception apparatus receiving the broadcast wave into a format appropriate for filtering in units of regions.

(37)

The transmission apparatus according to (36), wherein the region mapping information associates a target region tag used for identifying a region to which the emergency information is notified and at least one of a region code assigned to each predetermined region disposed inside an area represented by the target region tag and position information representing a predetermined position corresponding to the area represented by the target region tag.

(38)

The transmission apparatus according to any of (35) to (37), wherein the region mapping information is used for filtering a packet storing the emergency information in units of regions.

(39)

The transmission apparatus according to any of (35) to (38), wherein the region mapping information is used for filtering one or a plurality of messages included in the emergency information in units of regions.

(40)

The transmission apparatus according to (39), wherein the messages are filtered for each service provider providing a service.

(41)

The transmission apparatus according to (39), wherein the messages are filtered based on priority levels of the messages.

(42)

The transmission apparatus according to any of (36) to (41), wherein the reception position of the broadcast wave is information relating to a region set by a user or position information represented by a reception signal received from a positioning satellite.

(43)

The transmission apparatus according to any of (35) to (42), wherein the IP transmission system is compliant with ATSC 3.0, and wherein the emergency information and the region mapping information are transmitted in a layer lower than an IP layer in a protocol stack of the IP transmission system.

(44)

A transmission method for a transmission apparatus, the transmission method using the transmission apparatus including:

generating region mapping information associating emergency information notified to each region by using a broadcast wave of an IP transmission system and information relating to a region;

acquiring a content; and transmitting the content and the region mapping information using the broadcast wave and transmitting the emergency information in the case of emergency.

REFERENCE SIGNS LIST

1 Transmission system
10 Transmission apparatus
20 Reception apparatus
30 Server
80 Transmission channel
90 Internet
111 Component acquiring unit
113 Signaling generating unit
115 Region mapping information generating unit
116 Emergency information generating unit
117 Multiplexer
118 Transmission unit
211 Tuner
212 Demultiplexer
213 Signaling processing unit
214 Control unit
216 Memory
218 Display unit
219 Speaker
220 Emergency information processing unit
221 Communication unit
900 Computer
901 CPU

The invention claimed is:

1. A reception apparatus comprising:
circuitry configured to
  receive, via a broadcast signal, an emergency alerting message in an XML format that includes a message priority and at least one target area information, each of the at least one target area information including location information in a location element of the emergency alerting message and type information in a type attribute of the location element, the location information including at least a latitude and a longitude representative of a region; and
  control filtering such that emergency information for a location associated with the reception apparatus is acquired based on the at least one target area information, wherein
the type information indicates a format type of the location information,
the emergency alerting message includes a service identifier of an emergency-related audio/visual service and URL information of emergency content associated with the emergency alerting message.

2. The reception apparatus according to claim 1, wherein the emergency alerting message is associated with one or more areas.

3. The reception apparatus according to claim 1, wherein the circuitry is configured to identify one of the at least one target area information based on the location associated with the reception apparatus.

4. The reception apparatus according to claim 1, wherein each of the at least one target area information includes
  information used for identifying an area to which the emergency information is targetable, and
the location information for each of the at least one target area information includes at least one of an area code assigned to an area disposed inside an area represented by the respective target area information.

5. The reception apparatus according to claim 1, wherein the circuitry is configured to filter a packet including the emergency information in units of target areas.

6. The reception apparatus according to claim 1, wherein the circuitry is configured to filter one or a plurality of messages included in the emergency information in units of target areas.

7. The reception apparatus according to claim 6, wherein the circuitry is configured to filter the plurality of messages based on a service provider associated with at least one of the plurality of messages.

8. The reception apparatus according to claim 1, wherein the circuitry is configured to filter the emergency alerting message based on the message priority.

9. The reception apparatus according to claim 1, wherein the location associated with the reception apparatus belongs to a set including an area input from a user input unit and a position indicated by a received geo-location signal.

10. The reception apparatus according to claim 1, further comprising:
  a receiver configured to receive the broadcast signal that is transmitted using an IP (Internet Protocol) transmission system,
  wherein the broadcast signal is a digital television broadcast signal.

11. The reception apparatus according to claim 10, wherein
  the IP transmission system is compliant with ATSC (Advanced Television Systems Committee) 3.0, and
  the receiver is configured to receive the emergency information and the location information from the IP transmission system.

12. The reception apparatus according to claim 1, wherein
  the type information indicates one of a plurality of different format types, and
  the circuitry is configured to determine an area indicated by a geographic code according to the one of the plurality of different format types indicated by the type information.

13. The reception apparatus according to claim 1, wherein
  the emergency alerting message is included in an emergency information table, the emergency information table being in the XML, format, and
  the service identifier, the URL information, and the message priority are indicated by different elements in the emergency information table.

14. The reception apparatus according to claim 1, wherein the emergency alerting message includes text of the emergency alerting message to be displayed.

15. The reception apparatus according to claim 1, wherein the reception apparatus is a television receiver comprising a display and a speaker.

16. The reception apparatus according to claim 1, wherein the location information includes a plurality of latitudes and longitudes representative of the region.

17. A method of a reception apparatus for acquiring emergency information, the method comprising:
  receiving, by circuitry of the reception apparatus via a broadcast signal, an emergency alerting message in an XML format that includes a message priority and at least one target area information, each of the at least one target area information including location information in a location element of the emergency alerting message and type information in a type attribute of the location element, the location information including at least a latitude and a longitude representative of a region; and controlling, by the circuitry, filtering such that the emergency information for a location associated with the reception apparatus is acquired based on the at least one target area information, wherein the type information indicates a format type of the location information, the emergency alerting message includes a service identifier of an emergency-related audio/visual service and URL information of emergency content associated with the emergency alerting message.

18. The method according to claim 17, wherein the emergency alerting message is associated with one or more areas.

19. The method according to claim 17, further comprising:

identifying one of the at least one target area information based on the location associated with the reception apparatus.

20. The method according to claim 17, wherein each of the at least one target area information includes information used for identifying an area to which the emergency information is targetable, and the location information for each of the at least one target area information includes at least one of an area code assigned to an area disposed inside an area represented by the respective target area information.

21. The method according to claim 17, wherein the controlling the filtering comprises:

filtering a packet including the emergency information in units of target areas.

22. The method according to claim 17, wherein the filtering comprises:

filtering one or a plurality of messages included in the emergency information in units of target areas.

23. The method according to claim 22, wherein the filtering comprises:

filtering the plurality of messages based on a service provider associated with at least one of the plurality of messages.

24. The method according to claim 17, wherein the filtering comprises:

filtering the emergency alerting message based on the message priority.

25. The method according to claim 17, further comprising:

receiving, by a receiver, the broadcast signal that is transmitted using an IP (Internet Protocol) transmission system, wherein the broadcast signal is a digital television broadcast signal.

26. The method according to claim 17, wherein the location information includes a plurality of latitudes and longitudes representative of the region.

27. A non-transitory computer readable medium storing computer executable instructions which, when executed by a computer, cause the computer to perform a method comprising:

receiving, by circuitry of a reception apparatus via a broadcast signal, an emergency alerting message in an XML format that includes a message priority and at least one target area information, each of the at least one target area information including location information in a location element of the emergency alerting message and type information in a type attribute of the location element, the location information including at least a latitude and a longitude representative of a region; and controlling, by the circuitry, filtering such that emergency information for a location associated with the reception apparatus is acquired based on the at least one target area information, wherein the type information indicates a format type of the location information, the emergency alerting message includes a service identifier of an emergency-related audio/visual service and URL information of emergency content associated with the emergency alerting message.

* * * * *